United States Patent
Tamura et al.

(10) Patent No.: US 8,401,365 B2
(45) Date of Patent: Mar. 19, 2013

(54) RECORDING APPARATUS, IMAGING AND RECORDING APPARATUS, RECORDING METHOD, AND PROGRAM

(75) Inventors: Masayuki Tamura, Kanagawa (JP); Tsutomu Shimosato, Kanagawa (JP); Masashi Kishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 191 days.

(21) Appl. No.: 13/020,131

(22) Filed: Feb. 3, 2011

(65) Prior Publication Data
US 2011/0194835 A1     Aug. 11, 2011

(30) Foreign Application Priority Data
Feb. 10, 2010 (JP) .............................. P2010-028255

(51) Int. Cl.
*H04N 5/77* (2006.01)
*H04N 9/80* (2006.01)
(52) U.S. Cl. ....................................... 386/224; 386/248
(58) Field of Classification Search .................. 386/248, 386/291, 323, 326, 224, 239
See application file for complete search history.

(56) References Cited

U.S. PATENT DOCUMENTS

| 2007/0104463 A1* | 5/2007 | Ono et al. ...................... 386/112 |
| 2009/0016182 A1* | 1/2009 | Kubo et al. ................. 369/47.41 |
| 2009/0226149 A1 | 9/2009 | Shibata et al. |

FOREIGN PATENT DOCUMENTS

JP          2008 35394         2/2008

* cited by examiner

*Primary Examiner* — Robert Chevalier
(74) *Attorney, Agent, or Firm* — Frommer Lawrence & Haug LLP; William S. Frommer

(57) ABSTRACT

Disclosed herein is a recording apparatus including: an input section configured to input or generate main data and added data thereof; and a recording control section configured such that when the main data and the added data input or generated by the input section have each reached a predetermined data amount, the recording control section temporarily stores the main data and the added data in units of the predetermined data amount, that when the sum of the temporarily stored data has reached a specific write data unit, the recording control section transfers the temporarily stored data to recording media for recording thereto, and that when the amount of the temporarily stored data is less than that of the specific write data unit upon elapse of a predetermined time period since the most recent recording, the recording control section transfers the temporarily stored data to the recording media for recording thereto.

12 Claims, 19 Drawing Sheets

ONE FILE PLACEMENT UNIT

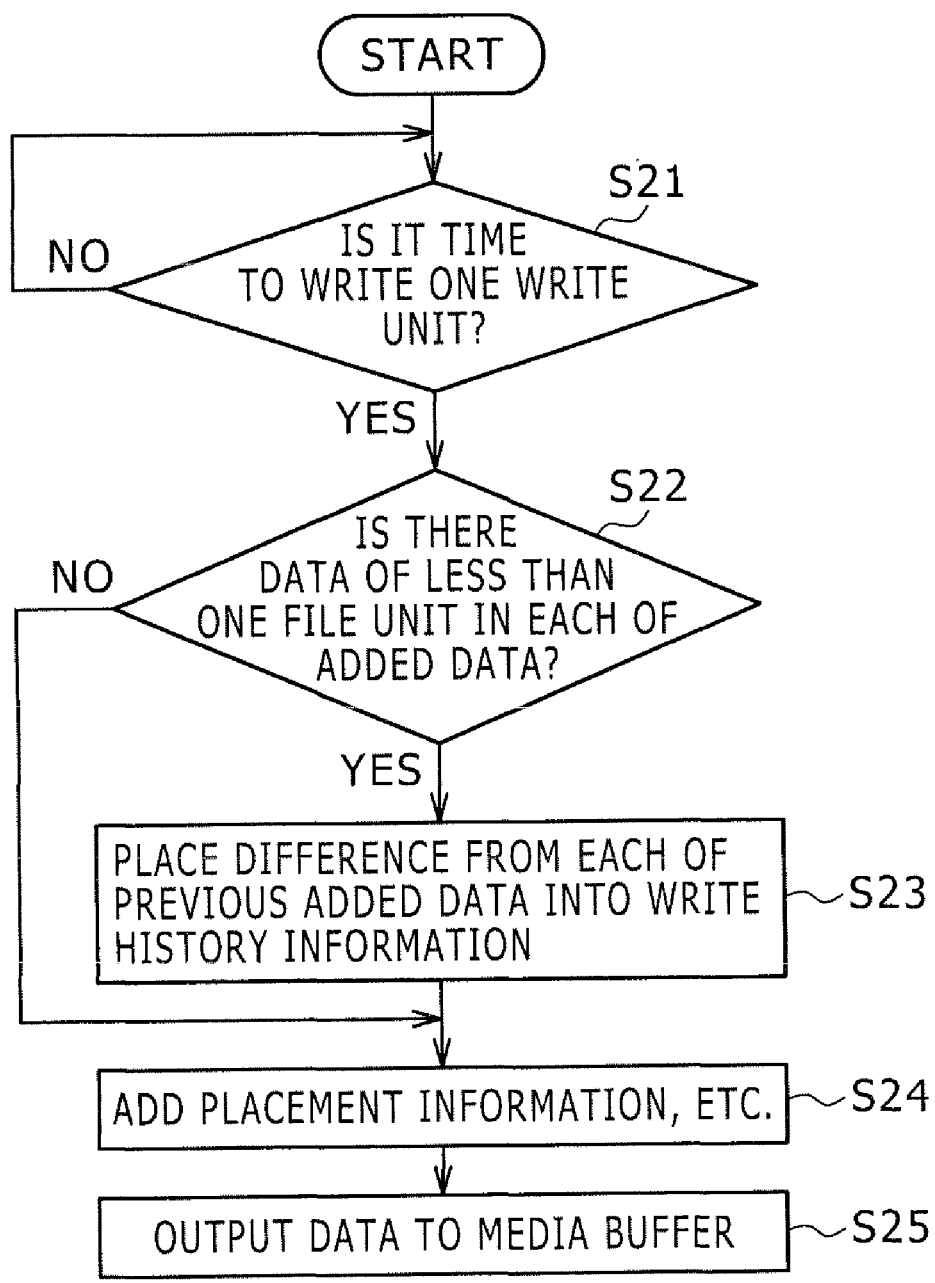

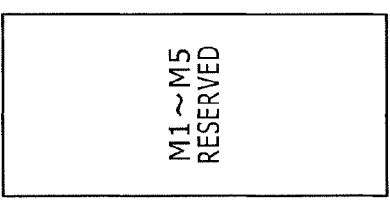
FIG. 6D
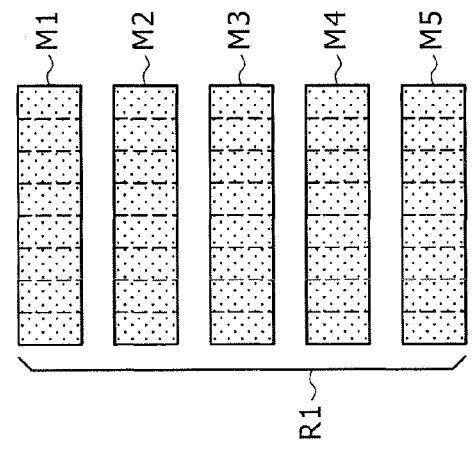
FIG. 6C
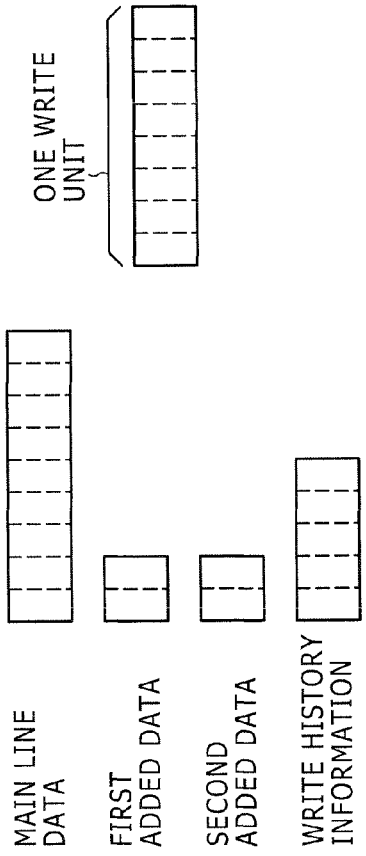
FIG. 6B
FIG. 6A

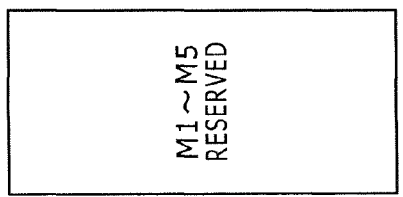
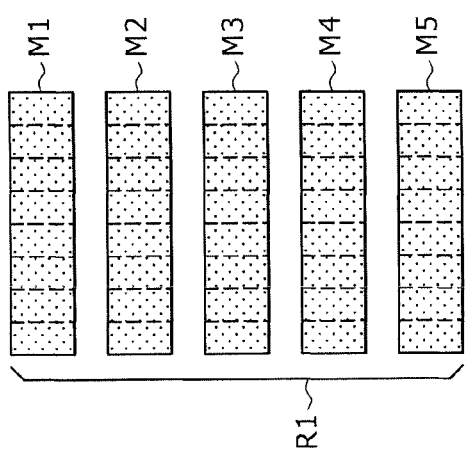
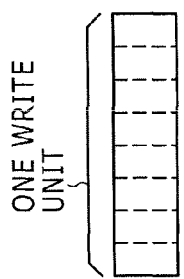
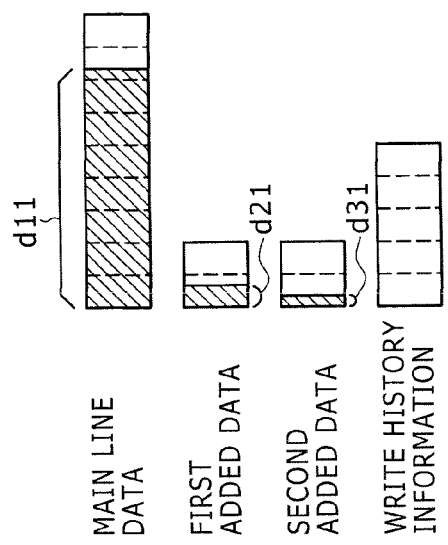

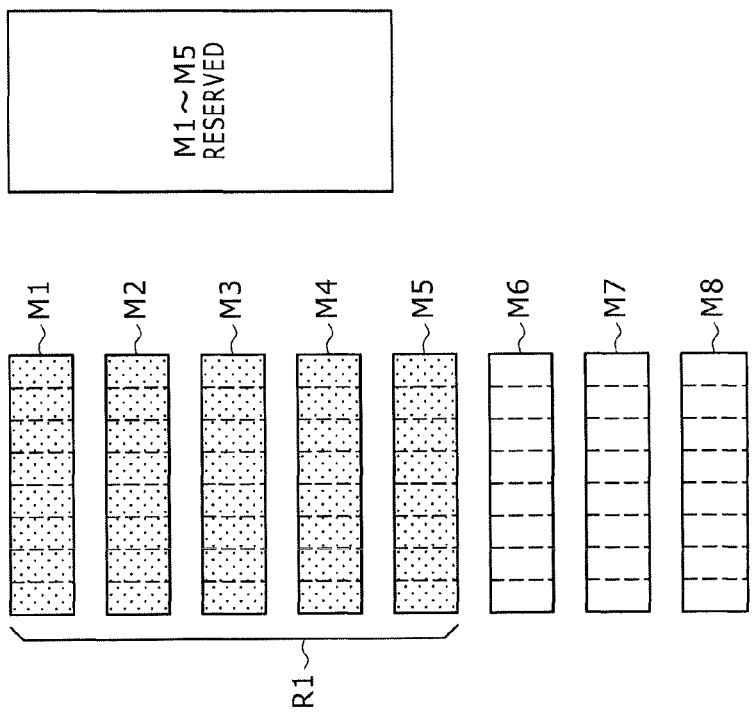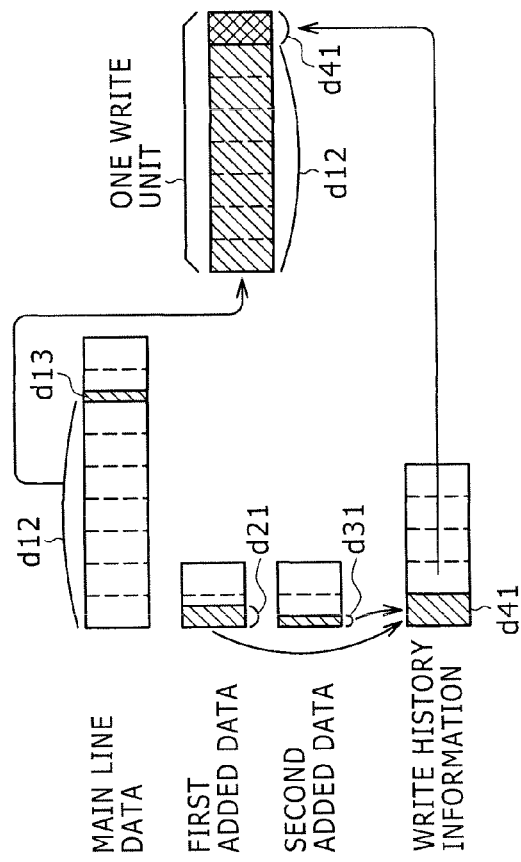

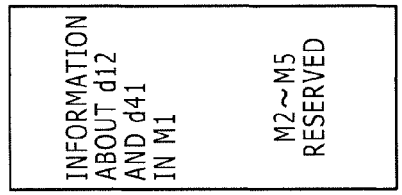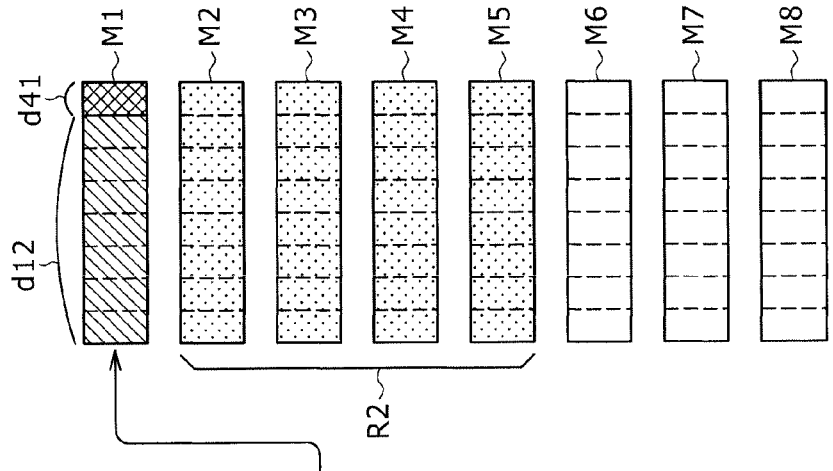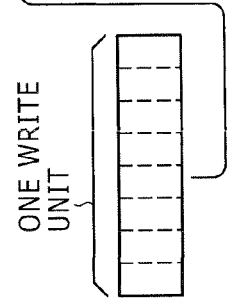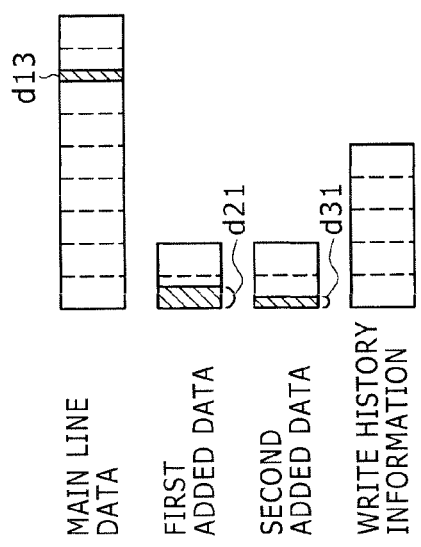

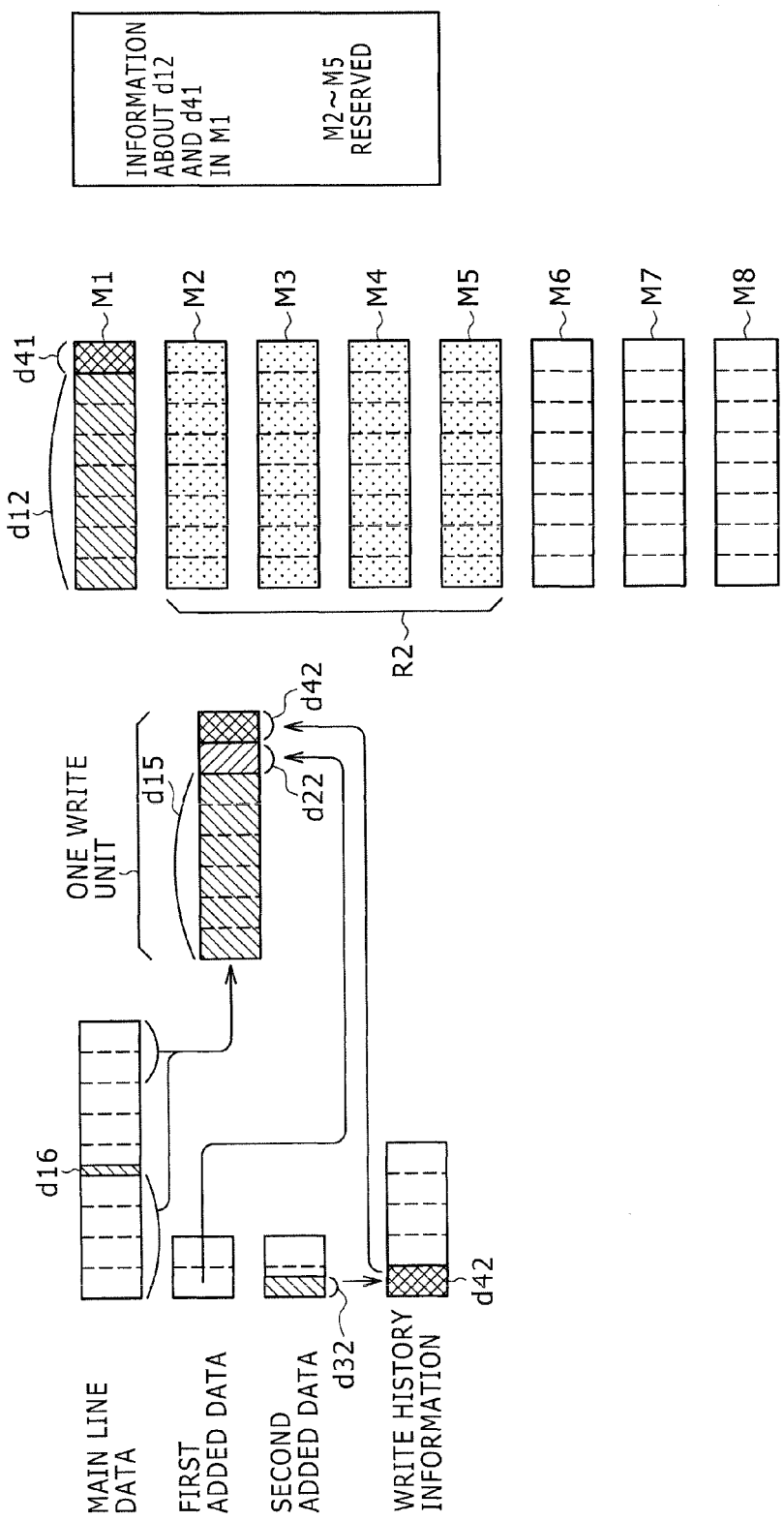

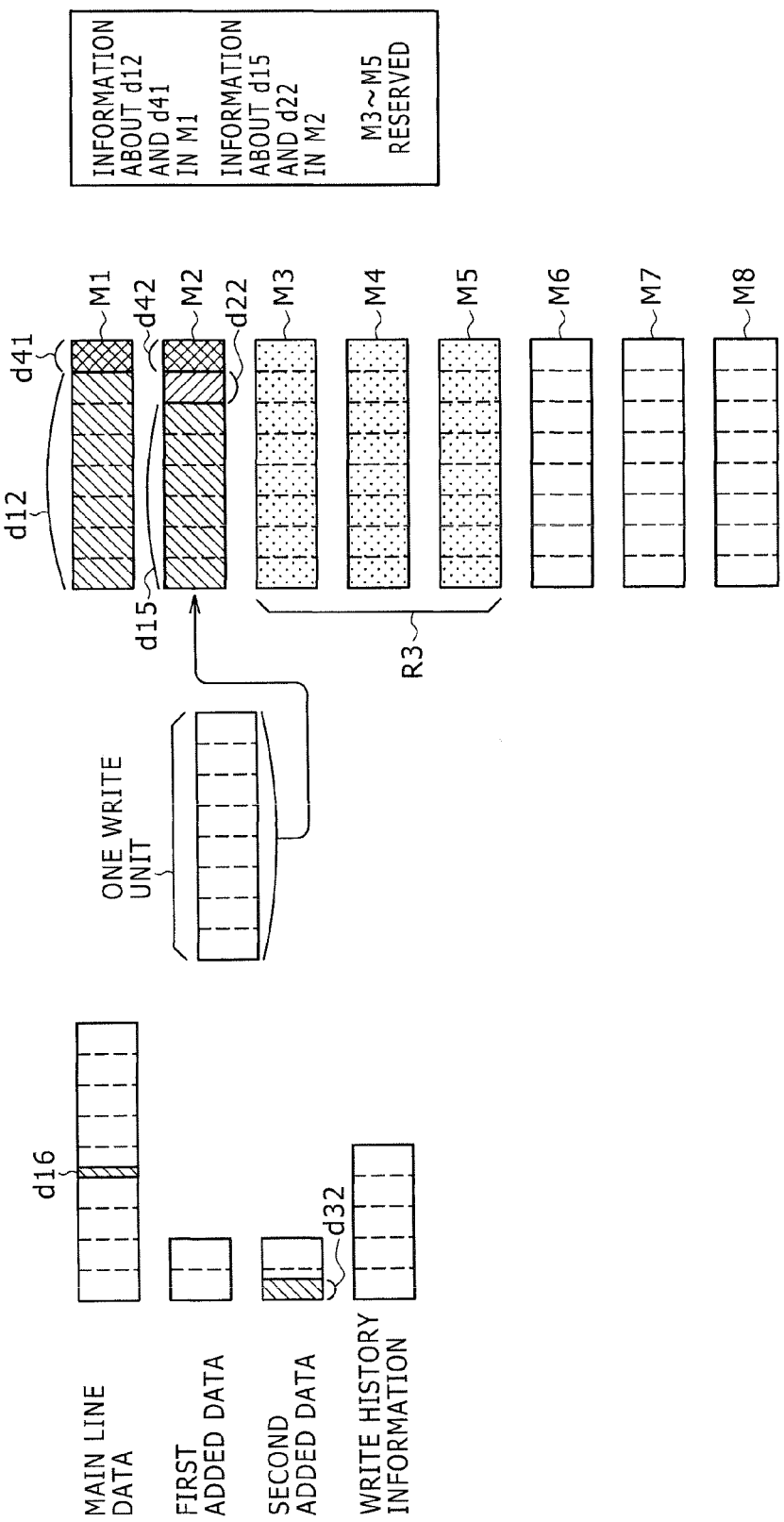

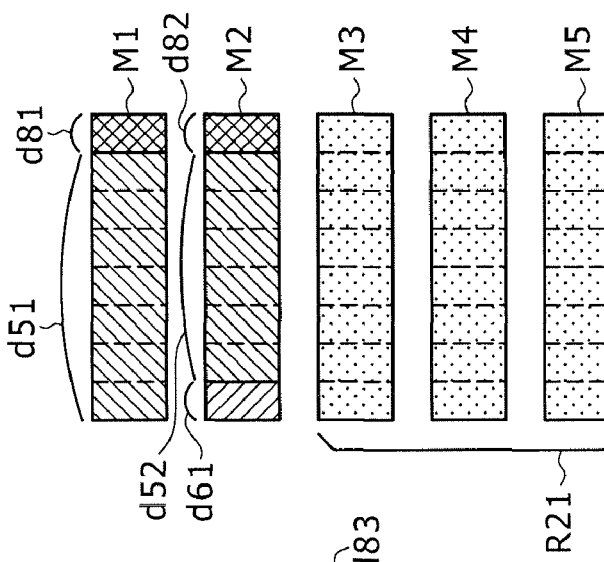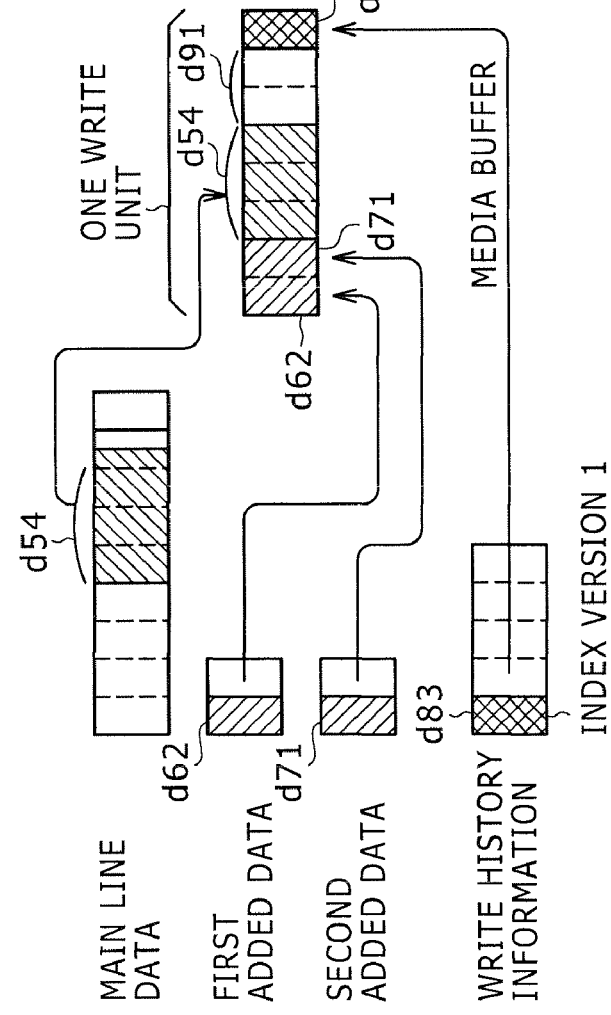

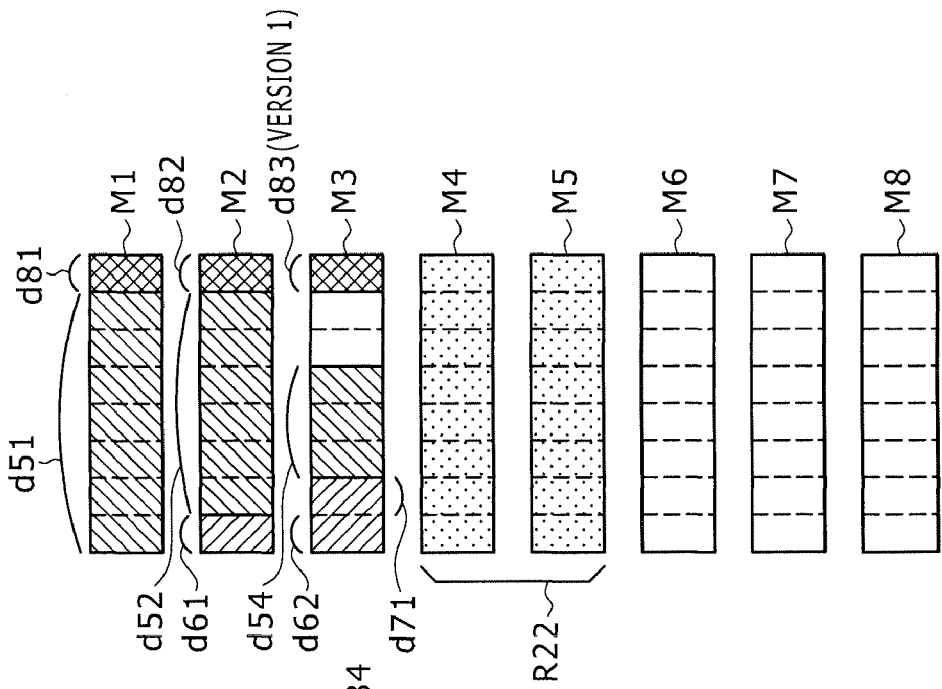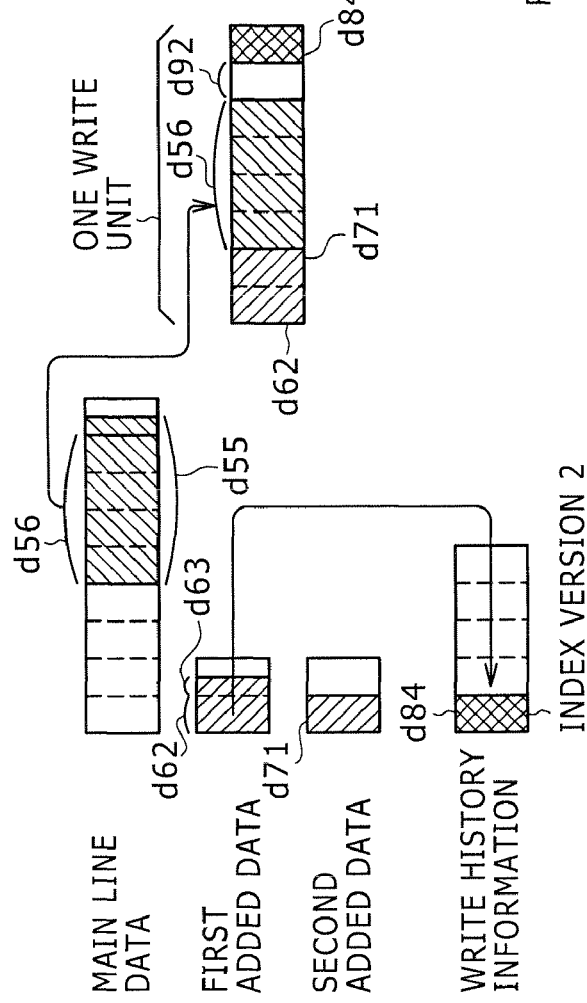

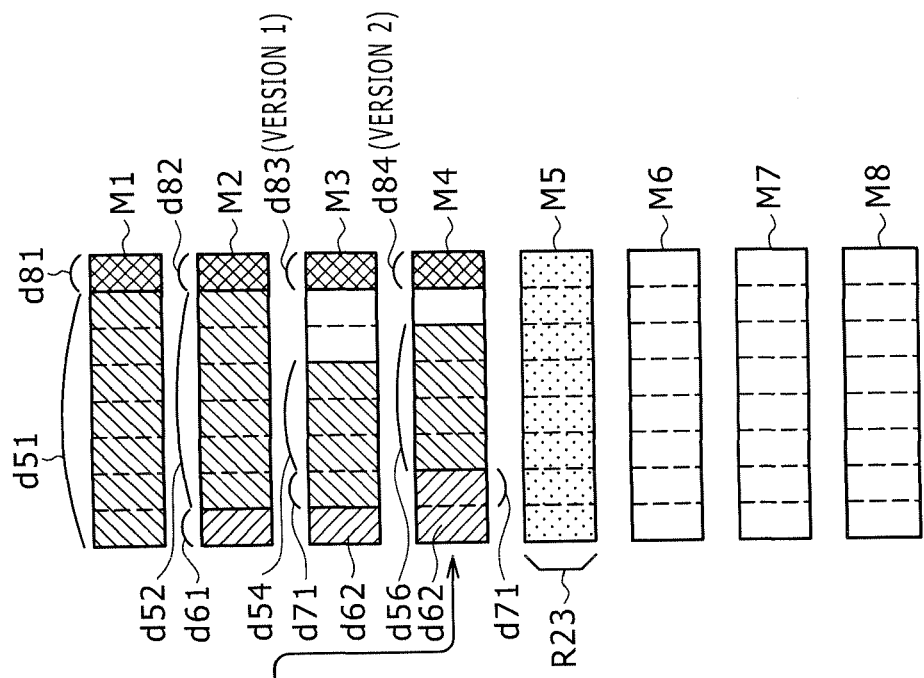
FIG.17A  FIG.17B  FIG.17C

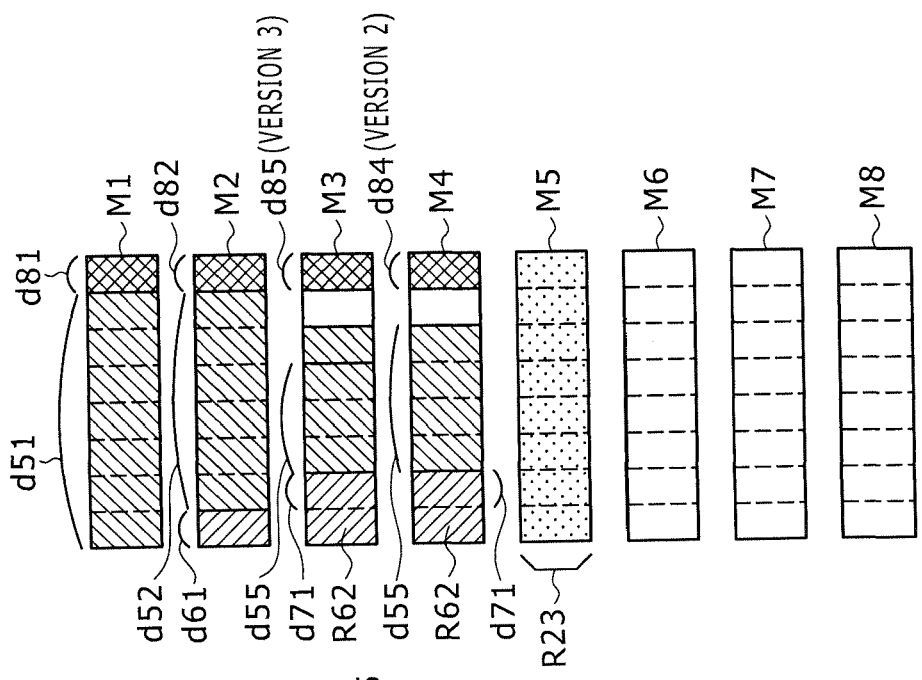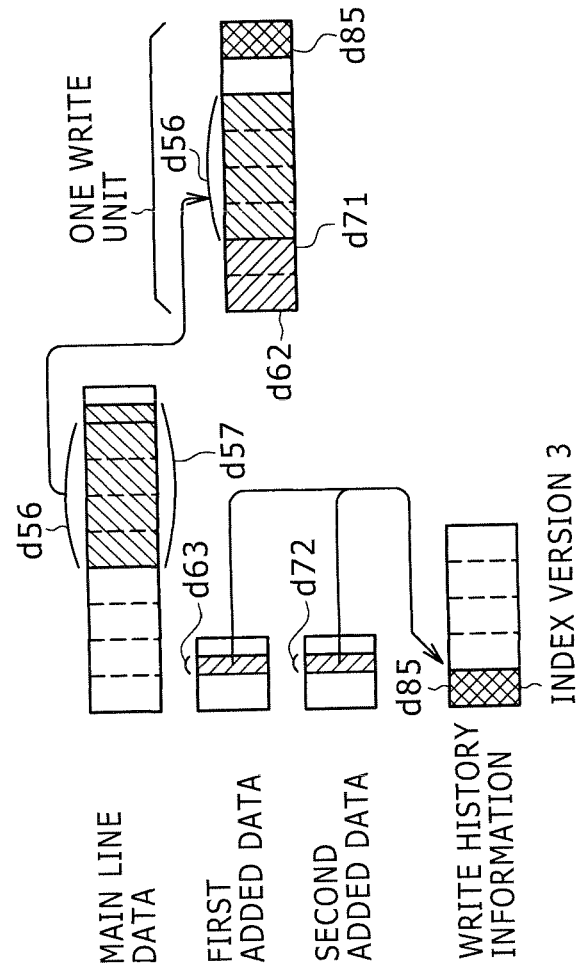

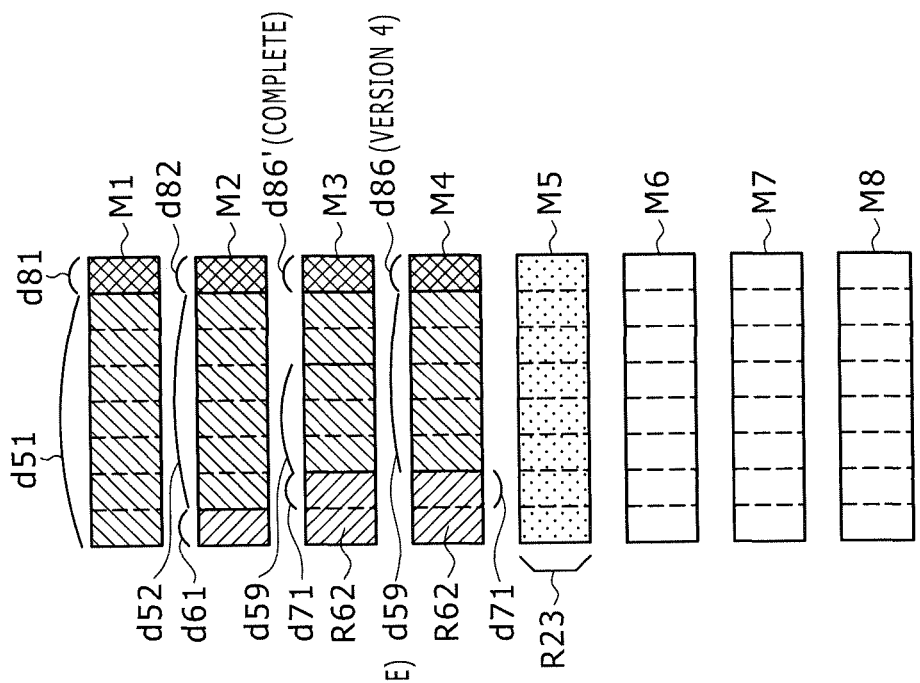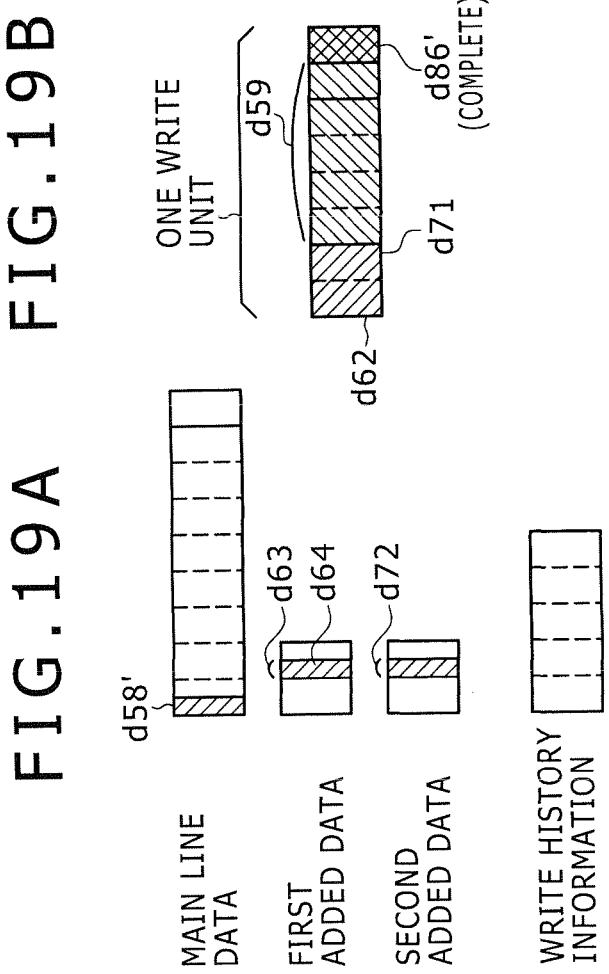

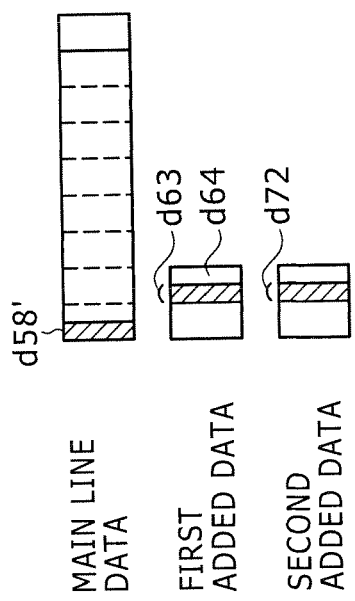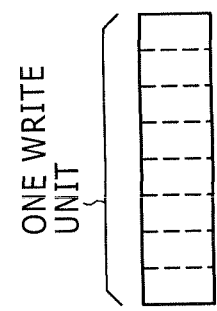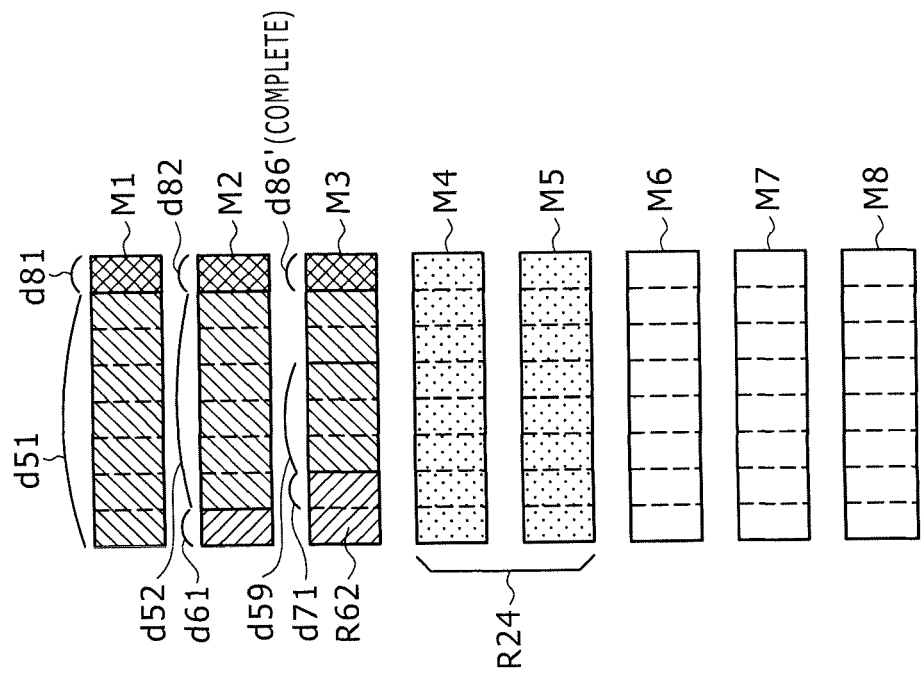

RECORDING APPARATUS, IMAGING AND RECORDING APPARATUS, RECORDING METHOD, AND PROGRAM

BACKGROUND OF THE INVENTION

1. Field of the Invention

The present invention relates to a recording apparatus for recording data using recording media such as a semiconductor memory, to an imaging and recording apparatus equipped with such a recording apparatus, to a recording method for use with such a recording apparatus and such an imaging and recording apparatus, and to a program for executing such a recording method.

2. Description of the Related Art

There have been commercialized various types of imaging and recording apparatuses each operating as an imaging device such as a video camera equipped with a recording capability. Some of the imaging and recording apparatuses developed in recent years utilize memory cards as their recording media, prompted by the widespread use and reduced costs of semiconductor memories constituting the memory cards.

The recording media such as a memory card is smaller and more lightweight than magnetic tapes or various disks that were previously used as the recording media for the imaging and recording apparatuses. Using such a memory card as the recording medium contributes to reducing the size of an imaging and recording apparatus furnished with that memory card. Also, the memory card is easy to attach and remove to and from a card slot in the body of the imaging and recording apparatus.

Japanese Patent Laid-Open No. 2008-35394 (called Patent Document 1 hereunder) discloses composition examples of an imaging apparatus that uses a semiconductor memory as its recording medium.

SUMMARY OF THE INVENTION

Where the semiconductor memory such as memory cards is used as the recording media of recording apparatuses such as video cameras, the following problems have been encountered.

For example, where video data is to be recorded to the semiconductor memory inside a memory card attached to the card slot of an imaging and recording apparatus, the video data acquired by an imaging section of the apparatus is supplied successively to the memory card and recorded to the semiconductor memory inside. The action of recording data to the semiconductor memory is also called storage or writing. In this specification, no distinction will be made among recording, storage, and writing.

The speed of writing data to the semiconductor memory can be increased by performing write and erase operations in units of a predetermined data amount. Thus the supplied video data is not simply forwarded successively to the semiconductor memory for recording; the video data is arranged into units of a predetermined data amount (record units) before being recorded to the semiconductor memory, whereby the speed of data recording is boosted. The record units correspond to so-called erase blocks of semiconductor memories.

Where the transfer rate of the video data acquired by the imaging and recording apparatus is relatively high, the composite video data reaches the data amount of a record unit in a relatively short time period. The video data is then transferred successively to the recording media side for recording to the semiconductor memory therein.

However, the generation rate of the acquired video data typically varies with imaging conditions. For example, if images with their subject remaining substantially stationary are being taken consecutively, the amount of the generated video data may drop, so that the generation rate of the data may decline correspondingly. The transfer rate may also drop if imaging involves a very long frame interval such as when intermittent image pickup is carried out.

Meanwhile, if the imaging operation being performed by the imaging and recording apparatus is abruptly halted for some reason, the video data which has been acquired by the imaging section of the apparatus and which has not yet reached the above-mentioned record unit is not recorded to the memory card.

Even if data is written to the recording medium of the apparatus, if the writing of the data is not reflected in file management information of the recording medium, then the data in question is not handled as recorded data. As a result, the data supposed to have been recorded actually disappears from the recording medium.

When an ordinary video camera is operated to stop the ongoing imaging operation, all acquired video data is recorded to the recording medium; the management data is updated accordingly; and an imaging stop process is performed to conclude the operation. In contrast, if the supply of power to the imaging and recording apparatus is abruptly halted, if the recording medium is removed from its slot during imaging, or if other irregularities are committed while imaging is underway, then the data yet to reach a record unit, or the data with its management information yet to be updated, disappears.

Thus when successively transferred data is to be recorded to the semiconductor memory, it is necessary to take appropriate measures to conduct the recording as efficiently as possible so that any remaining data not recorded to the recording apparatus proper will not occur. Although the problems above are experienced in any mode in which data is being recorded, it becomes particularly problematic when, as mentioned above, a low transfer rate of video data very often leads to a relatively long time period of video data not being recorded to the memory card.

Also, when video data or the like is to be recorded to the semiconductor memory, it is necessary simultaneously to record various added data such as audio data, time code data, and data indicating the correspondence between the video data and the audio data. In such a case, the video data is recorded as the video data while various types of added data are arranged by type into individual categories that are recorded to separate recording regions dedicated to the individual data types in the semiconductor memory.

However, another problem emerges in view of recording efficiency. Where the recording regions of the semiconductor memory are divided by data type so that various types of data are recorded thereto in parallel, some data may be recorded to the recording medium although it has yet to attain a record unit. More specifically, whereas video data is usually generated at a relatively high transfer rate, the above-mentioned added data is characterized by its low generation rate so that writing the added data alone to a single file may well be inefficient. Such inefficient data write operations prevent effective utilization of the recording capacity of semiconductor memories.

The present invention has been made in view of the above circumstances and provides inventive arrangements for performing the recording of data to recording media such as semiconductor memories usually at high speed, and efficiently even when the amount of generated data is small, while minimizing data loss upon inadvertent interruption of the data recording.

In carrying out the present invention and according to one embodiment thereof, there is provided a recording apparatus including:

an input section configured to input or generate main data and added data thereof; and a recording control section configured such that when the main data and the added data input or generated by the input section have each reached a predetermined data amount, the recording control section temporarily stores the main data and the added data in units of the predetermined data amount, that when the sum of the temporarily stored data has reached a specific write data unit, the recording control section transfers the temporarily stored data to recording media for recording thereto, and that when the amount of the temporarily stored data is less than that of the specific write data unit upon elapse of a predetermined time period since the most recent recording, the recording control section also transfers the temporarily stored data to the recording media for recording thereto.

According to one embodiment thereof, there is provided an imaging and recording apparatus including:

an imaging section configured to acquire video data through imaging; and a recording control section configured such that when the video data and added data thereof have each reached a predetermined data amount, the recording control section temporarily stores the video data and the added data in units of the predetermined data amount; that when the sum of the temporarily stored data has reached a specific write data unit, the recording control section transfers the temporarily stored data to recording media for recording thereto; and that when the temporarily stored data is less than the amount of the specific write data unit upon elapse of a predetermined time period since the most recent recording, the recording control section also transfers the temporarily stored data to the recording media for recording thereto.

According to one embodiment thereof, there is provided a recording method including the steps of:

when input or generated main data and added data thereof have each reached a predetermined data amount, temporarily storing the main data and the added data in units of the predetermined data amount;

when the sum of the temporarily stored data has reached a specific write data unit, transferring the temporarily stored data to recording media for recording thereto; and when the temporarily stored data is less than the amount of the specific write data unit upon elapse of a predetermined time period since the most recent recording, also transferring the temporarily stored data to the recording media for recording thereto.

According to one embodiment thereof, there is provided a program to be installed in and executed by an information processing apparatus, the program including the steps of:

when input or generated main data and added data thereof have each reached a predetermined data amount, temporarily storing the main data and the added data in units of the predetermined data amount;

when the sum of the temporarily stored data has reached a specific write data unit, transferring the temporarily stored data to recording media for recording thereto; and when the temporarily stored data is less than the amount of the specific write data unit upon elapse of a predetermined time period since the most recent recording, also transferring the temporarily stored data to the recording media for recording thereto.

Where the above-outlined recording method of the present invention is in use, data is recorded to the recording media in increments of the specific write data unit. When written in increments of the specific write data unit, the data is recorded rapidly and efficiently. Even when falling short of the specific write data unit, the data is recorded if a predetermined time period has elapsed since the most recent writing. Thus when the amount of input or generated data is small, the data is still recorded at intervals of the predetermined time period. This arrangement makes it possible reliably to record, say, streaming data at a low rate without prolonging the recording cycle longer than is necessary. If the write operation is stopped halfway before the data is recorded to the recording media and the management information thereof is updated accordingly, there still exists history information indicating that less than the specific write data unit of data was recorded. This permits restoration of the data in effect before that management information was updated.

According to the present invention embodied as outlined above, whereas data is recorded rapidly and efficiently in increments of the specific write data unit, the data less that the amount of the specific write data unit is still recorded at intervals of the predetermined time period. This makes it possible reliably to record data such as streaming data (e.g., video data) at a low rate without prolonging the recording cycle longer than is necessary. This mode of recording entails the additional recording of history information indicating that less than the specific write data unit of data was written. From that history information, it is possible to restore the recorded data in effect before the management information was updated.

BRIEF DESCRIPTION OF THE DRAWINGS

FIG. 5 is a flowchart showing a typical process of generating write history information performed by the embodiment;

FIGS. 6A, 6B, 6C and 6D are schematic views explanatory of how data is typically recorded by the embodiment (showing a process performed upon reservation);

FIGS. 7A, 7B, 7C and 7D are schematic views explanatory of how data is typically recorded by the embodiment (showing a state in which one write unit of data is input);

FIGS. 8A, 8B, 8C and 8D are schematic views explanatory of how data is typically recorded by the embodiment (showing generation of write history information);

FIGS. 9A, 9B, 9C and 9D are schematic views explanatory of how data is typically recorded by the embodiment (showing data written from a media buffer);

FIGS. 11A, 11B, 11C and 11D are schematic views explanatory of how data is typically recorded by the embodiment (showing input to the write buffer in a second cycle);

FIGS. 12A, 12B, 12C and 12D are schematic views explanatory of how data is typically recorded by the embodiment (showing a process of writing data from the write buffer in the second cycle);

FIGS. 15A, 15B and 15C are schematic views explanatory of how data is typically recorded by the embodiment (showing a first example in which the amount of generated data is small);

FIGS. 16A, 16B and 16C are schematic views explanatory of how data is typically recorded by the embodiment (showing a second example in which the amount of generated data is small);

FIGS. 17A, 17B and 17C are schematic views explanatory of how data is typically recorded by the embodiment (showing a third example in which the amount of generated data is small);

FIGS. 18A, 18B and 18C are schematic views explanatory of how data is typically recorded by the embodiment (showing a fourth example in which the amount of generated data is small);

FIGS. 19A, 19B and 19C are schematic views explanatory of how data is typically recorded by the embodiment (showing a fifth example in which the amount of generated data is small); and FIGS. 20A, 20B and 20C are schematic views explanatory of how data is typically recorded by the embodiment (showing a sixth example in which the amount of generated data is small).

DETAILED DESCRIPTION OF THE PREFERRED EMBODIMENTS

The preferred embodiments of the present invention will now be described under the following headings:

1. Typical structure of the entire imaging apparatus (FIG. 1)
2. Typical structure in which data is written to recording media (FIG. 2)
3. Explanation of the data write unit (FIG. 3)
4. Operations of the data recording process (FIGS. 4 and 5)
5. Specific examples of the data recording operations (FIGS. 6A through 12D)
6. Processing example in which less than one write unit of data is written (FIGS. 13A through 14B)
7. Specific operation examples in which small amounts of generated data are recorded (FIGS. 15 through 17C)
8. Variations

[1. Typical Structure of the Entire Imaging Apparatus]

One preferred embodiment of the present invention will be explained below as an imaging apparatus 1 capable of recording and reproducing video and audio data using a memory card as a piece of removable recording media. Although the imaging apparatus 1 is in fact an imaging and recording apparatus equipped with a recording capability, or an imaging, recording and reproducing apparatus, the inventive apparatus will be simply referred to as the imaging apparatus hereunder.

Although the recording medium for use with this embodiment is called the memory card, the recording medium does not have to be a card type memory as long as it is a removable recording medium incorporating a semiconductor memory. The recording medium may be any one of diverse types of currently commercialized memory devices other than the memory cards. The recording medium may be one of the recording media incorporating something other than the semiconductor memory. In the description that follows, the recording medium for use by this embodiment will be referred to as the recording media.

Figure 1:
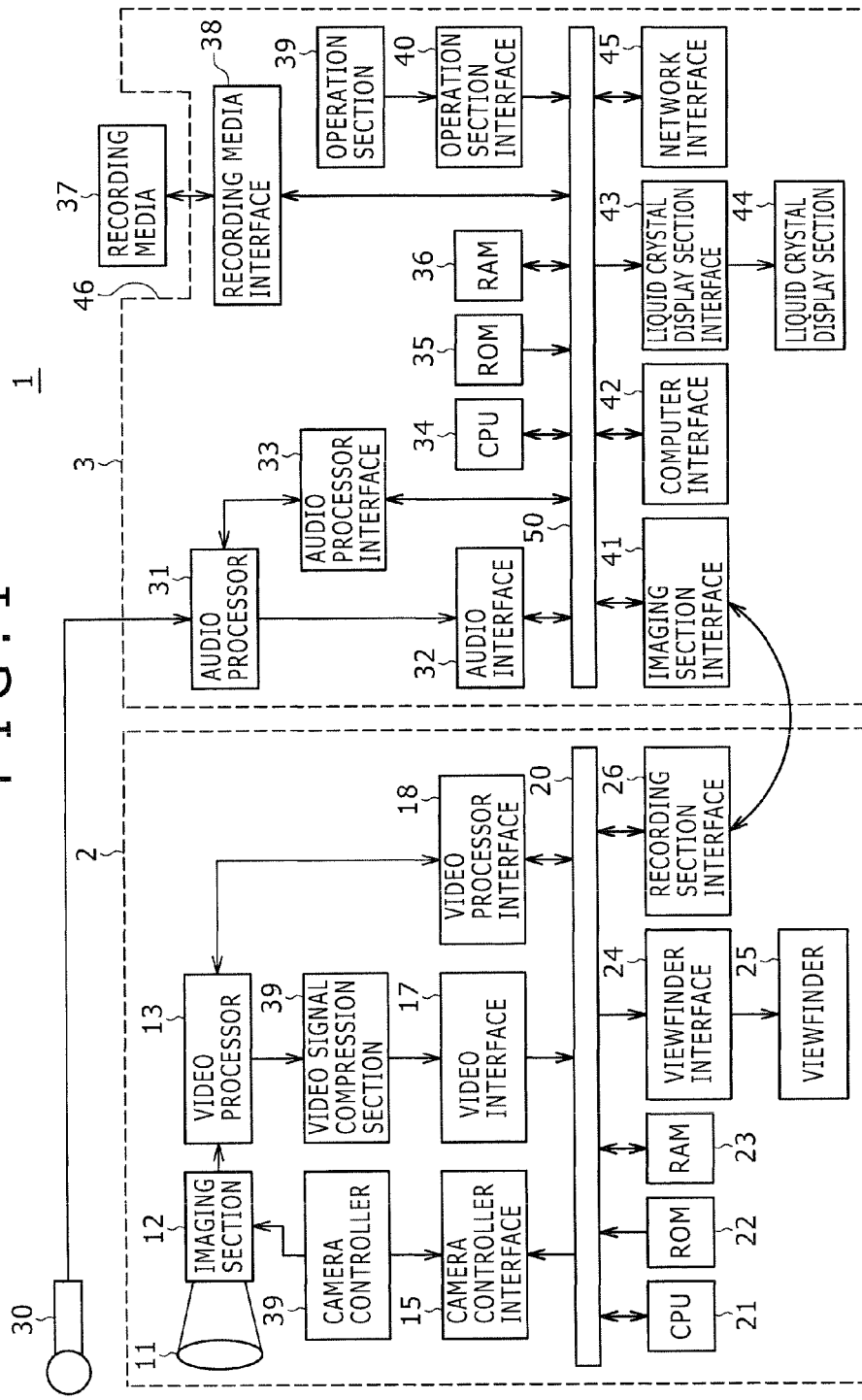
FIG. 1 is a block diagram showing a typical structure of an imaging apparatus as one embodiment of the present invention.

FIG. 1 is a block diagram showing a typical internal structure of the imaging apparatus 1 embodying this invention. The imaging apparatus 1 is made up of an imaging section 2 and a recording section 3, the imaging section 2 controlling a video camera and generating video data thereby, the recording section 3 recording and reproducing video data, audio data, and metadata to and from a semiconductor memory.

What follows is an explanation of the components constituting the imaging section 2. Imaging light is input through an optical section 11 made up of lenses, an aperture, filters, etc. An imaging section 12 subjects the input imaging light to photoelectric conversion to generate an analog video signal. The imaging section 12 is typically constituted by a solid-state image sensing device such as a CCD (charge coupled device) imager. The imaging section 12 thus acquires an imaging signal and supplies it to a video processor 13 that includes an analog/digital converter and an image adjustment facility and the like. The video processor 13 converts the supplied imaging signal to digital video data for image adjustment purposes. The video processor 13 proceeds to send the converted digital video signal to a video signal compression section 16 that compresses digital video data using a predetermined method. The video signal compression section 16 compression-encodes the supplied digital video signal typically according to the MPEG (Moving Picture Experts Group) standard. Then the video signal compression section 16 sends the compressed video data onto a data bus 20 through a video interface 17. The compressed video data is forwarded to the recording section 3 via a recording section interface 26, to be discussed later, for storage into a semiconductor memory inside recording media 37, to be discussed later as well. Diverse kinds of data for use by the imaging section 2 are sent to the relevant components via the data bus 20.

When a user operates an operation section 39, to be discussed later, the recording section 3 feeds an operation signal reflecting the user's operation to a CPU 21 via the imaging section interface 41, the recording section interface 26 and data bus 20. The CPU (central processing unit) 21 acting as control means to control the components of the imaging section 2 interprets the supplied operation signal. Upon interpreting the operation signal, the CPU 21 reads a control program from a ROM 22 in a suitably timed manner and stores temporary data and parameters and the like temporarily into a RAM 23. The ROM 22 is a read-only memory, and the RAM 23 is a random access memory to which data can be written.

The CPU 21 converts the operation signal fed from the operation section 39 into a control signal for driving the imaging section 12, and sends the control signal to a camera controller 14 via a camera controller interface 15. Based on the supplied control signal, the camera controller 14 controls aperture, zoom, and filter operations of the imaging section 12. Also, the CPU 21 supplies an image processing signal designating image processing to the video processor 13 via a video processor interface 18. Based on the supplied image processing signal, the video processor 13 performs a compression process on the digital video signal.

The imaging section 2 includes a viewfinder 25 that displays the images being taken, reproduced images, and metadata. The currently taken images, reproduced images, and metadata transmitted over the data bus 20 are displayed on the viewfinder 25 having a liquid crystal display via a viewfinder interface 25.

The components of the recording section 3 will now be explained below. A microphone 30 pointed in the direction of an object picks up ambient sounds to generate analog audio data. The microphone 30 supplies the analog audio signal thus generated to an audio processor 31 that includes an analog/digital converter and an audio adjustment facility and the like. The digital audio processor 31 converts the supplied analog audio signal into digital audio data for audio adjustment purposes. And the audio processor 31 feeds the digital audio data onto a data bus 50 via an audio interface 32. The audio data is stored into the semiconductor memory inside a recording media 37, to be discussed later. Diverse kinds of data for use by the recording section 3 are sent to the relevant components via the data bus 50.

The operation section 39 made up of buttons, switches, etc., not shown, is used to perform recording, reproducing, and editing operations on the imaging section 2 and recording section 3. A manual operation such as one for starting imaging performed on the operation section 39 causes the section 39 to generate an operation signal. The operation section 39 supplies the generated operation signal to a CPU 34 for control over the components inside the recording section 3, via an operation section interface 40 and the data bus 50. At recording time, operation signals are supplied to the imaging section 2 via an imaging section interface 41, to be discussed later. The CPU 34 interprets the supplied operation signal and reads the control program from the ROM 35 in a suitably timed manner, while storing temporary data and parameters and the like temporarily into the RAM 36.

The imaging apparatus 1 of this embodiment has its recording section 3 equipped with a card slot 46 to and from which the recording media 37 can be attached and removed. The recording media 37 incorporates a semiconductor memory. Data recording states inside the recording media 37 will be described later.

The recording media 37 attached to the card slot 46 can transfer data to and from a data processing section inside the recording section 3 via a media interface 38.

Although the structure of FIG. 1 shows one card slot 46, the recording section 3 may be structured alternatively to have a plurality of card slots. And apart from the recording media 37 attached to the card slot 46, the recording section 3 may contain another recording medium such as a memory or a hard disk to which video data or other data may be recorded.

The imaging section interface 41 is connected to the data bus 50 to let the recording section 3 exchange data with the imaging section 2. The video data acquired by the imaging section 2 is supplied and recorded to the recording media 37 via the recording section interface 26, imaging section interface 41, data bus 50, and recording media interface 38. At the time of recording, the CPU 34 functions as a recording control section that performs a control process for recording purposes.

The CPU 34 causes a liquid crystal display section 44 to display on its liquid crystal display screen monitor images, time codes, audio levels, metadata, and various menus by way of the data bus 50 and a liquid crystal display interface 43. The video data, audio data and other data retrieved from the recording media 37 may also be displayed as reproduced video images on the liquid crystal display section 44.

The imaging section 1 is furnished with a computer interface 42 for exchanging data with an external computer. The computer interface 42 complies typically with the USB standards and is capable of transmitting data an externally connected computer, not shown, and of causing connected speakers to output reproduced audio data audibly. Also, the imaging apparatus 1 is furnished with a network interface 45 used for data exchanges over a network. The network interface 45 may be connected to a server or an external computer, not shown, for transfer of data thereto and therefrom.

[2. Typical Structure in which Data is Written to Recording Media]

Figure 2:
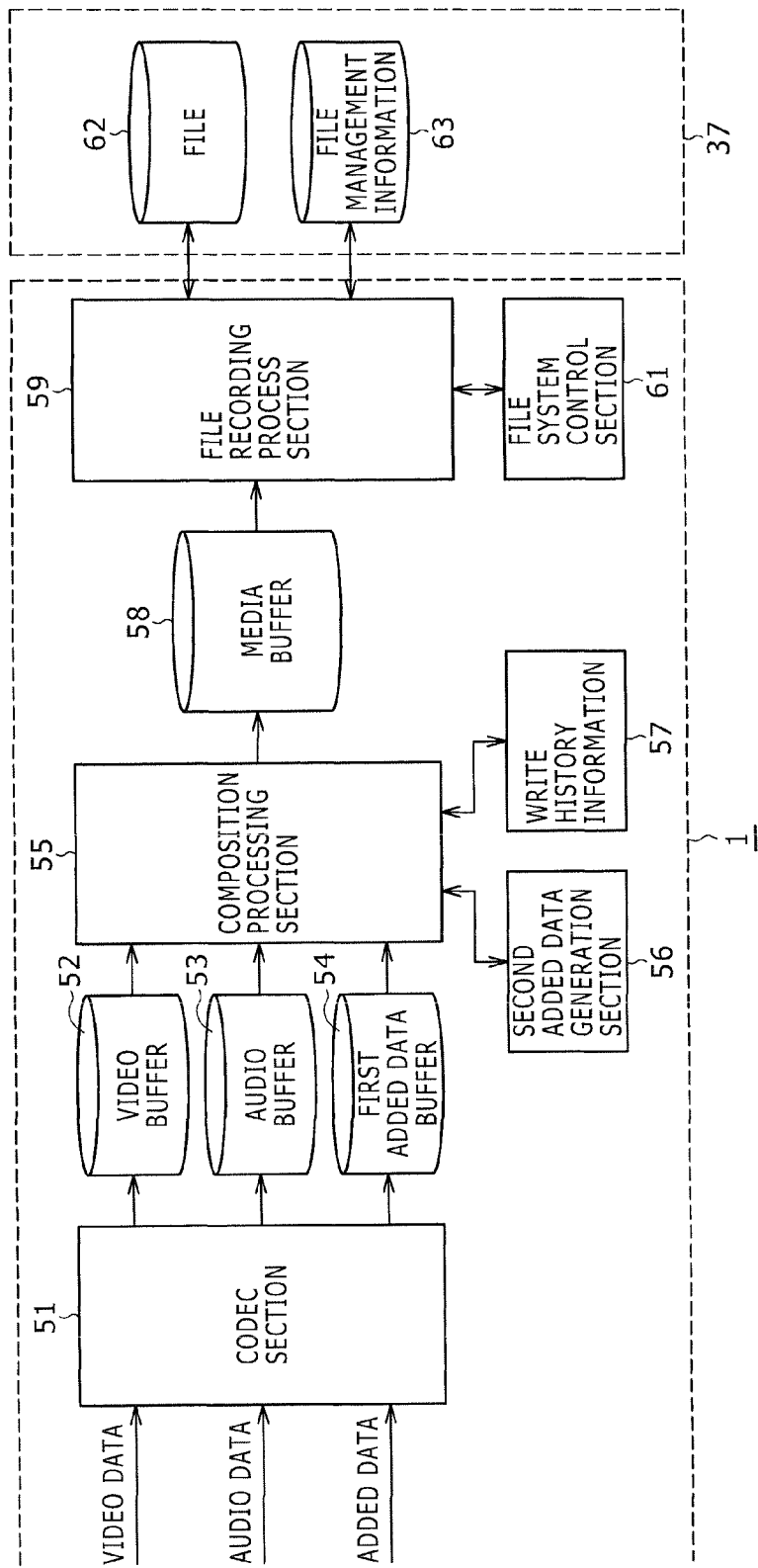
FIG. 2 is a block diagram showing a typical structure in which data is recorded by the embodiment.

Described below in reference to FIG. 2 is a processing structure in which the imaging apparatus 1 records video data and other data to the recording media 37.

FIG. 2 is a functional block diagram depicted in terms of the flow of data to be recorded. Diverse processes shown in FIG. 2 are carried out using the video processor 13, CPU 21, CPU 34, RAM 23, and RAM 36 indicated in FIG. 1.

Where video data is to be recorded to the recording media 37 with this embodiment, an added information (i.e., added data) file and write history information are recorded and processed in addition to the video data and audio data constituting the main data. The data in the added information file is data such as time codes that are generated in conjunction with video data (the data in the file is called metadata). The added data is generated by relevant blocks in the imaging section 2 and recording section 3 before being input to a recording block of the recording section 3. The time code indicates a point in time of each frame position.

In the ensuing description, the added data described above will be referred to as first added data that is distinguished from second added data, to be described later.

As shown in FIG. 2, video data, audio data, and the first added data are supplied to a codec section 51 and compressed and encoded thereby for recording purposes, before being stored temporarily in buffers dedicated individually to different types of data. That is, there are provided a video buffer 52, an audio buffer 53, and an added information buffer 54 which accommodate the corresponding input data.

The data stored in the buffers 52, 53 and 54 are sent to a composition processing section 55 for composition into a single stream of data, and the composite data is stored into a media buffer 58. The media buffer 58 acts as storage means to store a single write unit of data, i.e., an amount of data to be recorded in a single write operation in being recorded to the recording media 37. In this example, the amount of data recorded to the recording media 37 in a single write operation is equal to the smallest increment of data in which data is erased from the recording media 37.

The composition processing section 55 is connected with a second added data generation section 56 and a write history information generation section 57. The second added data generation section 56 generates data (second added data) that serves as a pointer pointing to the correspondence between video data and audio data. The second added data thus generated is input to the composition processing section 55.

The write history information generation section 57 generates write history information attached to each unit of data that is recorded to the recording media 37. Details of the write history information will be discussed later.

The generated second added data and write history information are also composited by the composition processing section 55. Although not shown, the second added data in this structure is also sent to the composition processing section 55 in units of a data amount commensurate with the amount of data being generated by the second added data generation section 56 and stored into an internal buffer. The write history information is generated every time one unit of data is recorded to the recording media 37.

When write data fed from the composition processing section 55 to the recording media 37 is accumulated in the latter to a level equal to one write unit, the content of the media buffer 58 is output to a file recording process section 59 under control of the CPU 34 acting as the recording control section. The data sent to the file recording process section 59 is output to the recording media 37 for recording thereto as a file 62. Management data about the file 62 is record as file management data 63 in a region apart from the file 62. The data recorded as the file management data 63 is controlled by a file system control section 61 connected to the file recording process section 59.

The data stored in the media buffer 58 is sent successively beginning with a start block to the recording media 37. The data is recorded to the file 62 of the recording media 37 in the order in which the data was sent to the media 37.

[3. Explanation of the Data Write Unit]

Figure 3:
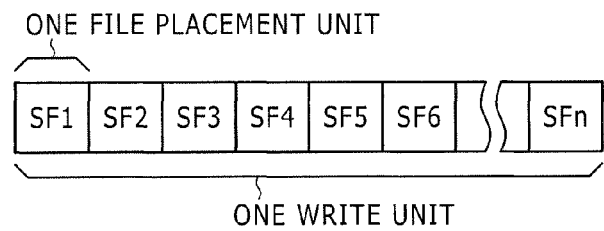
FIG. 3 is a schematic view explanatory of a data write unit for use by the embodiment.

FIG. 3 is a schematic view outlining a data write unit in which data is recorded to the recording media 37.

As shown in FIG. 3, one write unit (one recording unit) is established as a capacity equal to an integer multiple of a file placement interval (one block). That is, blocks SF1, SF2, ..., SFn ("n" is an integer) are arranged to constitute one file write unit. In this example, one file write unit is arranged to match a block erase unit of the semiconductor memory 37 for use by this embodiment. The recording media 37 used by this embodiment is characterized by its rapid accessibility when accessed in units of this file placement interval. Each file placement interval is constituted by a unit of multiple sectors, i.e., an integer multiple of a sector that is the smallest increment. Data can be accessed at high speed in units of this file placement interval.

As typical data units, one sector on certain recording media is set to 512 bytes while the multiple sector unit in which data can be read rapidly is set to 32 KB. For this embodiment, one file placement interval is a multiple of the multiple sector unit (32 KB) that permits high-speed data read operations, so that recorded data is read out rapidly in units of one file placement.

Typically, one file placement interval (one block) may be 2 MB and one write unit may be 16 MB. In this case, one write unit is made up of eight blocks. By letting one write unit coincide with the erase block unit, it is possible to carry out write operations at high speed.

The media buffer 58 shown in FIG. 2 has a storage capacity of a single write unit. It should be noted that these values and block counts are examples.

[4. Operations of the Data Recording Process]

Figure 4:
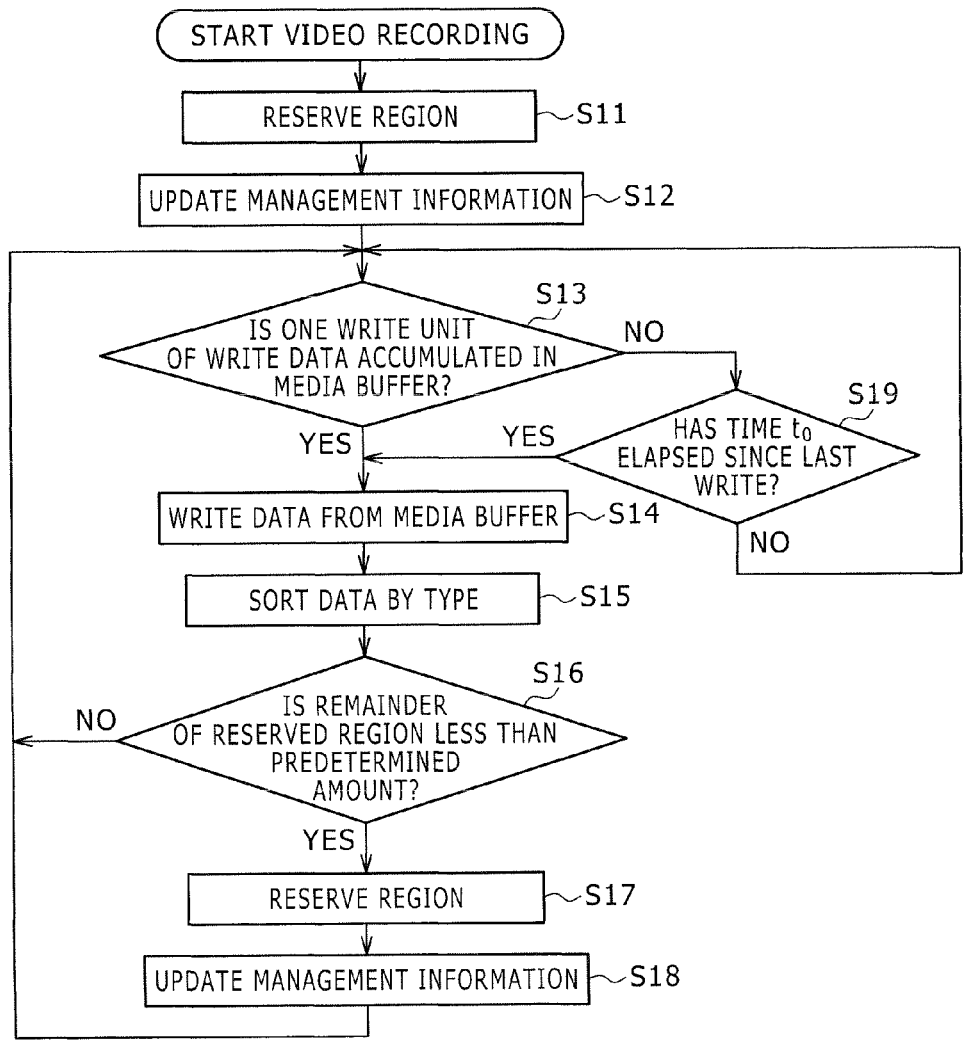
FIG. 4 is a flowchart showing a typical write process performed by the embodiment.

Described below in reference to FIGS. 4 and 5 is the data recording process performed by the imaging apparatus as the embodiment of the present invention.

As shown in FIG. 4, when the process of recording video data is started, the CPU 34 in charge of recording control reserves a recording region on the recording media (in step S11). The recording region is reserved in units of an integer multiple of one write unit indicated in FIG. 3. In order to finalize the reservation, management data is written to the file management information 63 in the recording media 37 (in step S12).

As described, the reservation is made by simply writing relevant management information to the recording media. The actual recording region thus reserved is not subject to any particular processing. If any previously written data is found in the reserved region, the data is left undeleted.

The CPU 34 in charge of recording control determines whether or not one write unit of write data is stored in the media buffer 58 (in step S13). If it is determined that one write unit of write data is stored in the media buffer 58, the stored data is transferred from the media buffer 58 to the recording media 37 and recorded to the file 62 as the recording section of the recording media 37 (in step S14). At this point, the data is transferred successively beginning with the start data from the media buffer 58 to the recording media 37. The transferred data is written successively beginning with the start data to the recording section inside the recording media 37, whereby one write unit of write data is recorded as a single file.

Later, the data recorded collectively in increments of one write unit is sorted by data type (in step S15). The sorting process is accomplished by rewriting the file management information managed by a file system. The data types are determined based on the write data placed in the media buffer 58. The process of sorting data is performed by the file system control section 61 in FIG. 2. At this point, data has yet to be written to the file management information 63 on the recording media 37. The management data having undergone the sorting process is held by the file system control section 61.

Then it is determined whether or not the reserved region on the recording media 37 has less than a predetermined amount and needs to be expanded (in step S16). If it is determined that the reserved region needs to be expanded, then a relevant region reservation process is performed (in step S17). The region reservation process is also carried out by the file system control section 61 in FIG. 2. At this point, data has yet to be written to the file management information 63 of the recording media 37. The management data having undergone the sorting process is held by the file system control section 61.

Then an update process is carried out (in step S18) to record collectively both the management data generated during the sorting process of step S15 and the management data generated during the region reservation process of step S17 to the file management information 63 inside the recording media 37. After the update process, step S13 is reached again for another process of determining the data amount.

If it is determined in step S13 that one write unit of write data has yet to be accumulated in the media buffer 58, then it is determined (in step S19) whether or not a predetermined time $t_0$ has elapsed since the last recording of data to the recording media 37. For example, the predetermined time $t_0$ is set to 20 seconds.

If it is determined that the time $t_0$ has elapsed, then step S14 is reached. In step S14, the data accumulated so far in the buffer 58 is written to the recording media 37. At this point, the write history information is also attached to the write data.

If it is determined in step S19 that the time $t_0$ has yet to elapse since the last write operation, step S13 is reached again for another determination.

If it is determined in step S16 that the reserved region need not be expanded, step S13 is also reached again for another determination. Thus the file management information 63 on the recording media 37 is updated collectively together with the management data about the data written so far, solely when the reserved region is to be expanded. In this manner, the update count of the file management information 63 is minimized.

A typical process of generating the data constituting write history information will now be explained by referring to the flowchart of FIG. 5. It is the write history information generation section 57 in FIG. 2 that generates the data making up the write history information.

As shown in FIG. 5, it is initially determined whether or not it is time to write one write unit of data accumulated in the media buffer 58 to the recording media 37 (in step S21). If it is determined that it is not time yet to write the data, an appropriate write timing is awaited.

If it is determined that the write timing is reached, then it is determined whether or not the first added data or the second added data has yet to be accumulated to a level commensurate with the data amount of one file placement (in step S22).

If there exists data yet to reach the data amount of one file placement, then the first or the second added data yet to reach the data amount of one file placement is placed as the data making up the write history information (in step S23). If the most recently generated write history information also had the first or the second added data placed likewise, then data reflecting the difference between the first or the second added data and the last generated write history information is placed. It should be noted that the data reflecting the difference with regard to the first or the second added data is placed in step S23 only if one write unit of data is recorded. When less than one write unit of data is to be recorded, as will be explained later in reference to FIG. 13 and other figures, the first and the second added data will be recorded cumulatively until the recording of one write unit of data is completed.

Furthermore, the data indicating the placement of various types of data within one write unit of data is added as the data constituting the write history information. Also, the data indicative of a version or of whether data is complete is added as needed as the data making up the write history information. These kinds of data are added to make the data constituting the write history information fulfill one write unit of data.

The generated data as the write history information is supplied to the media buffer 58 and stored into the last region of the media buffer 58. When the data constituting the write history information is placed at the end of the media buffer 58, the write history information is retrieved lastly therefrom upon data transfer from the media buffer 58 to the recording media 37. As a result, where the write history information is correctly written to the recording media 37, each write unit of the data written along with the write history information can be handled as effective data recorded appropriately to the recording media 37.

Through the use of the write history information placed and written to the recording media 37 as described above, it is possible to resume correctly the process of data recording to the recording media 37 if the process is halted halfway for some reason. That is, it is possible to determine from the write history information up to where the data has been written in the reserved region.

[5. Specific Examples of the Data Recording Operations]

Some specific examples of the recording operations will now be explained by referring to FIGS. 6A through 12D.

Of the FIGS. 6A through 12D, those identified by reference character A indicate how the input data to the recording section or the data generated thereby is typically stored. Specifically, the stored state corresponds to the data being held in the buffers 52, 53 and 54 in FIG. 2. In the figures, main line data refers to data in a video-audio multiplex file in which the video data and audio data are multiplexed to make up the main data. The first added data and second added data refer to the added data explained above. The write history information refers to the data generated upon data recording as discussed above.

Of the figures, those identified by reference character B indicate the stored state of data in the media buffer 58.

Of the figures, those identified by reference character C indicate the recorded states of (part of) the regions on the recording media 37.

Also of the figures, those identified by reference character D indicate the management data written as file management information.

In FIGS. 6A through 12D, examples are given using one write unit having eight files placed therein. The recording region of the recording media 37 shows eight recording areas M1 through M8. One recording area M1 has a storage capacity commensurate with one write unit of data.

In FIGS. 6A through 12D, each blank region indicates the state in which no data is written, and each shaded region indicates either a data-written state or a reserved state.

The explanation below will be given beginning with FIGS. 6A through 6D.

In reference to FIGS. 6A through 6D, the reservation process of step S11 is first explained along with the process performed in step S12 typically to write reservation information as management data.

In the state of FIGS. 6A through 6D, there is neither input data nor generated data as shown in FIG. 6A. No data is stored in the media buffer 58 as shown in FIG. 6B. In this state, a plurality of recording areas are reserved in the memory card. In this example, as indicated in FIG. 6C, five recording areas M1 through M5 are allocated as a reserved region R1.

Data about the reserved region R1 (i.e., data indicating that the areas M1 through M5 have been reserved) is written in step S12 as management data to a region of the file management information 63 managed by the file system control section 61 on the side of the recording media 37.

FIGS. 7A through 7D show the state in which one write unit of data is input or generated, with the reservation completed as indicated in FIGS. 6A through 6D. As shown in FIG. 7A, data d11 whose amount exceeds seven file placement units is stored in the buffer as the main line data (video data and audio data). The first added data d21 and the second added data d31 have a data amount of less than one write unit each.

FIGS. 8A through 8D show an example in which given the data input as indicated in FIGS. 7A through 7D, relevant write history information is generated and written to the media buffer.

In this state, the first added data d21 and the second added data d31 having a data amount of less than one write unit each are placed unmodified into the data d41 constituting the write history information. This placement process corresponds to step S23 in the flowchart of FIG. 5. Of the first added data d21 and second added data d31, those that can be omitted may be omitted before the data are placed into the write history information.

Also, placement data is added into the write history information, the data identifying each of the data placed in units of eight files in the media buffer 58. The data adding process corresponds to step S24 in the flowchart of FIG. 5. The data constituting the write history information generated so far is considered data whose amount corresponds to one file placement unit.

Of the data d11 whose amount exceeds seven file Placement units, data d12 of seven file placement units is transferred as the main line data to the media buffer 58 for storage therein. Further, the data d41 constituting the write history information is stored into a region measuring one file placement unit at the end of media buffer 58. Data d13 whose amount is less than one file placement unit of the main line data is left stored in the video buffer or elsewhere for the continuous storage process. Also, the first added data d21 and second added data d31 placed in the data d41 constituting the write history information are left stored in their respective buffers for the continued storage process.

When the processes so far have been carried out, one write unit of data is stored in the media buffer 58. Then, the process moves on to the write process of FIGS. 9A through 9D.

During the write process of FIGS. 9A through 9D, one write unit of data stored in the media buffer 58 is transferred successively beginning with the start data to the recording media 37 and recorded to the first area (area M1 in this example) of the reserved region therein. The state in which the data is written to the area M1 is the same as the state in which the data was stored in the media buffer 58, in that the main line data d12 is placed into seven file placement units from the beginning and the data d41 making up the write history information is placed into one file placement unit at the end.

The recorded data above indicates that as shown in FIG. 9D, the main line data d12 and the data d41 of the write history information are placed in the area M1. Also, the area M1 is changed from a reserved region into a recorded region, and the reserved region R2 is changed into areas M2 through M5. At this point, however, the updated management data is held inside the file system control section 61 in FIG. 2 and has yet to be recorded to the recording media 37.

Figures 10A, 10B, 10C, 10D:
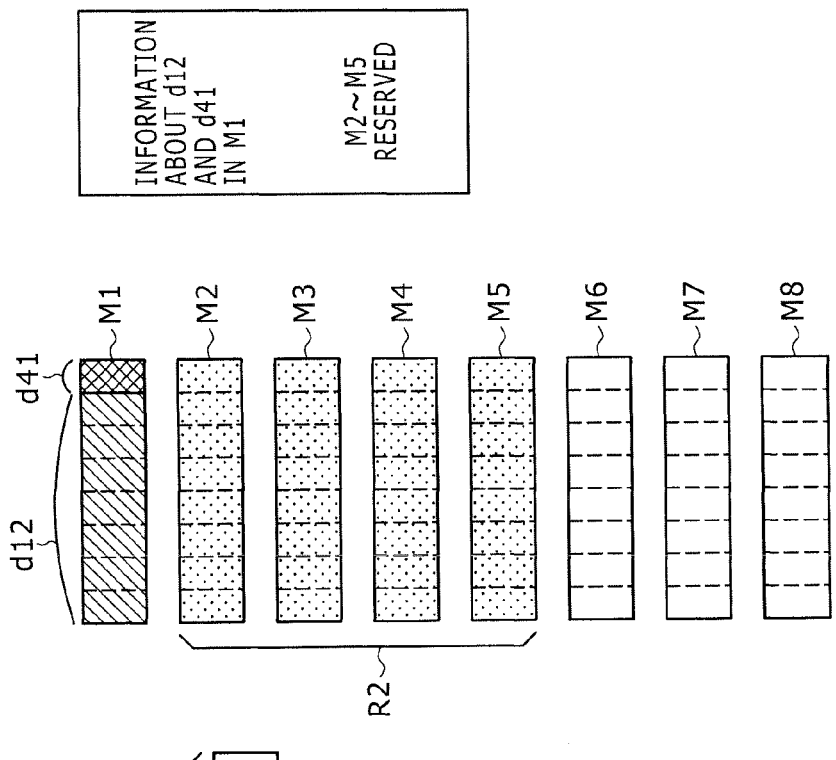
FIGS. 10A, 10B, 10C and 10D are schematic views explanatory of how data is typically recorded by the embodiment (showing an example in which the amount of an added information file has reached one file unit)

FIGS. 10A through 10D show the state in which an additional one write unit of data is input or generated, in the state that the writing process indicated in FIGS. 9A through 9D is carried out. As shown in FIG. 10A, data d14 whose amount exceeds six file placement units is stored as the main line data (video data and audio data) in the buffer. Incidentally, the buffer for main line data such as one shown in FIG. 10A is a ring buffer in which the locations of stored data are successively shifted.

Also, the first added data d22 is shown as one file placement unit of data being stored. The amount of the second added data d32 continues to be less than one file placement unit.

FIGS. 11A through 11D show the state in which, subsequent to the stored state in FIGS. 10A through 10D, the data is written to the media buffer 58 and write history information is generated.

In this state, of the data d14 (FIG. 10A) whose amount exceeds six file placement units, data d15 whose amount corresponds to six file placement units is transferred as the main line data to the media buffer 58 for storage therein. Also, the first added data d22 of one file placement unit is transferred to the media buffer 58 for storage therein. Furthermore, data d42 constituting the write history information is stored into a region of one file placement unit at the end of the media buffer 58.

The second added data d32 whose amount is less than one file placement unit is placed into the data d42 making up the write history information. In this case, the data representing the difference between the second added data d31 placed in the most recent write history information on the one hand and the second added data d32 on the other hand is placed as the data d42.

When the processes so far have been carried out, the data of eight file placement units making up one write unit is stored in the media buffer 58. Then, the process moves on to the write process of a second cycle shown in FIGS. 12A through 12D. The main line data d16 whose amount is less than one file placement unit and the second added data d32 whose amount is less than one file placement unit are left stored in their respective buffers for the continuous storage process.

In the write process of FIGS. 12A through 12D, one write unit of data stored in the media buffer 58 is transferred successively beginning with the start data to the recording media 37 and recorded to the first blank area (area M2 in this case) of the reserved region. The state in which the data is recorded to the area M2 is also the same as the state in which the data was stored in the media buffer 58, in that the main line data d15 is placed into six file placement units from the beginning, that the first added data d22 is placed into the next one file placement unit, and that the data d42 making up the write history information is placed into one file placement unit at the end.

The recorded data above indicates that as shown in FIG. 12D with management data, the main line data d12 and the data d41 of the write history information are placed in the area M2. The area M2 is changed from a reserved region to a recorded region, and the reserved region R3 is changed into areas M3 through M5. At this point, the updated management data is still held by the file system control section 61 in FIG. 2 and has yet to be recorded to the recording media 37.

When the reserved region is changed so that its remaining capacity has become less than a predetermined amount, a process is carried out to expand the reserved region. The process of expanding the reserved region is performed in step S17 of the flowchart in FIG. 4. Thereafter, the management data for which the reserved region is expanded and the management data stemming from the sorting process of step S15 are recorded collectively and simultaneously to the file management information 63 of the recording media 37 in step S18.

[6. Processing Example in which Less than One Write Unit of Data is Written]

The write process examples explained so far involve having one write unit (shown in FIG. 3) of data accumulated in the media buffer 58 before it is written to the memory card.

With this embodiment, if less than the above-described one write unit of write data is accumulated in the media buffer 58 and if a specific condition is met since the most recent write operation, then that less than one write unit of data is written. The specific condition in this case is typically a predetermined time period that has elapsed since the last write operation. The time period may be set typically to 10 to dozens of seconds. Such a state can take place when the image being taken remains substantially unchanged so that the amount of generated data is small, or when a special imaging operation is being conducted involving a very long cycle in which to take each frame of image.

Figure 13:
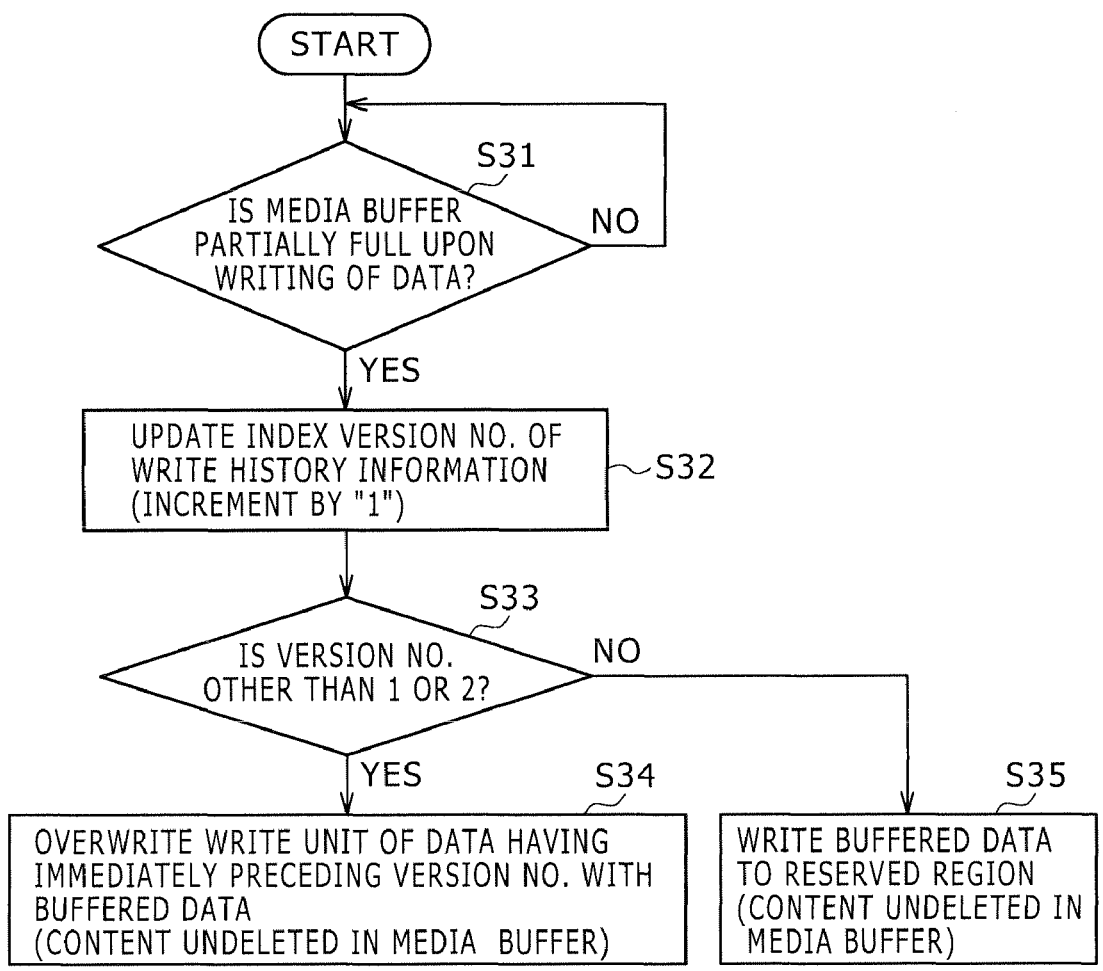
FIG. 13 is a flowchart showing a typical process carried out in the writing of less than one write unit of data.

Explained below in reference to the flowchart of FIG. 13 is a process in which less than one write unit of data is buffered and written. The process of the flowchart in FIG. 13 is carried out in step S14 of the flowchart in FIG. 4 in which data is written to the media buffer.

Referring to the flowchart of FIG. 13, it is first determined whether or not it is necessary to write less than one write unit of data being buffered (in step S31). If it is determined that a predetermined time period has elapsed since the most recent write operation and that it is therefore necessary to perform a write operation, then step S32 is reached. The determination that the predetermined time period has elapsed since the last write operation and that a write operation needs to be carried out accordingly corresponds to the transition from step S19 to step S14 in the flowchart of FIG. 4.

In step S32, data denoting an index version is attached to the write history information generated at this point. The index version is a number indicative of the number of times data has been updated. The most recent index version number (written last time) is incremented by "1" to provide the index version number. For the first update since the start of the write operation of less than one write unit of buffered data, the version value is set to "1."

It is then determined whether the version number set in step S32 is "1" or "2," or is a number other than "1" or "2" (in step S33). If the determination reveals that the version number is other than "1" or "2," then the recording region having the version number immediately preceding the last version number recorded in the memory is overwritten with the data stored in the media buffer (in step S34).

If the version number is "1" or "2," then the data accumulated in the media buffer is written to a blank region next to the reserved region (in step S35).

Where less than one write unit of buffered data is to be written, basically the same data is repeatedly recorded until the buffer is filled with one complete write unit of data. This is a state in which the data newly accumulated in the media buffer is additionally recorded until the next write operation is carried out.

Figure 14:
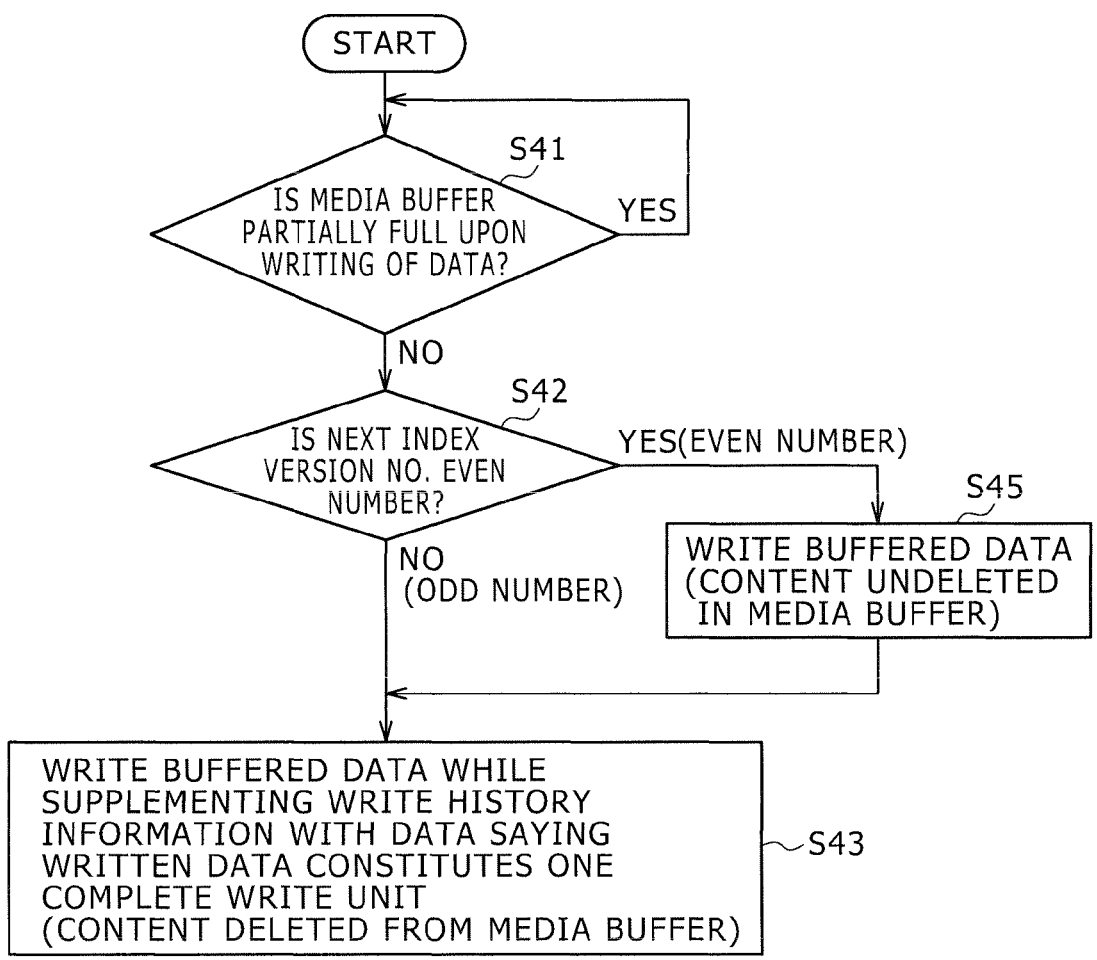
FIG. 14 is a flowchart showing a typical process carried out after the writing of less than one write unit of data is started by the embodiment.

The flowchart of FIG. 14 shows a processing example involving the transition from the state in which less than one write unit of data is written, to the state in which one complete write unit of data is to be written. The process of the flowchart in FIG. 14 is also carried out in step S14 of the flowchart in FIG. 4 in which data is written to the media buffer.

As shown in FIG. 14, it is first determined whether or not less than one write unit of buffered data is continuously written (in step S41). This step is repeated in a wait state as long as less than one write unit of buffered data is written continuously. The wait state involving the continuous writing of less than one write unit of buffered data corresponds to the continuous write state following the transition from step S19 to step S14 in the flowchart of FIG. 4.

If in step S41 it is determined that the state in which less than one write unit of buffered data is written is no longer in effect (i.e., a state in which one complete write unit of data is written is brought about), then step S42 is reached for another determination.

In step S42, it is determined whether or not the version number of the index to the next write operation is an even number. If it is determined that the version number is an odd number, then data indicating that the write data in question constitutes one complete write unit is added to the write history information, and the data accumulated in the media buffer is transferred and written to the memory card (in step S43). In this case, the data stored in the media buffer is erased at the same time as the data is written to the memory card. The recording region accommodating one write unit of data with the version number immediately preceding the last version number (i.e., version number determined in step S42) becomes a reserved region as it is.

If it is determined in step S42 that the version number of the index to the next write operation is an even number, then the data accumulated in the media buffer is transferred and written to the memory card while the data in the media buffer is left undeleted (in step S45). Then step S43 is reached; the data indicating that the write data in question constitutes one complete write unit is added to the write history information; and the data accumulated in the media buffer is transferred and written to the memory card (in step S43). Step S43 is followed by step S44.

Thus upon transition from step S45 to step S43, the same data is written twice in steps S45 and S43 except for the write history information.

[7. Specific Operation Examples in which Small Amounts of Generated Data are Recorded]

Specific operation examples in which the steps shown in FIGS. 13 and 14 are actually carried out will now be described successively by referring to FIGS. 15A through 20C. Of FIGS. 15A through 20C, those identified by reference character A indicate generated data (or input data); those identified by reference character B denote a stored state of the media buffer each; and those identified by reference character C represent a recorded state of the recording regions in the memory card each. In FIGS. 15A through 20C, as in FIGS. 6A through 6D and elsewhere, each shaded area is an area with data recorded therein, and each blank area has no data held inside.

Referring to what is shown in FIGS. 15A through 15C, it is assumed that this example involves having data already recorded in memory areas M1 and M2 and that a predetermined time period has elapsed since the writing of data to the area M2. It is also assumed that only main line data d54, first added data d62, second added data d71, and write history information d83 are accumulated in the media buffer that has a blank region d91. Because this is a state of the first write with a black region, an index version number "1" is added as the write history information D83. Alternatively, some dummy data may be added to the blank region d91. Dummy data may also be added to other blank regions. Reference character R21 indicates a reserved region.

At this point, as shown in FIGS. 16A through 16C, the data held in the media buffer as indicated in FIG. 15B is written to an area M3. Thus a part of the area M3 is left blank with no data written thereto (or with zero data written therein).

It is assumed that upon elapse of another predetermined time period following the writing of data to the area M3, more than four file placement units of data d55 have been accumulated as the main line data and that four file placement units out of the data D55 are transferred as data d56 to the media buffer, as shown in FIGS. 16A and 16B. It is also assumed that first added data d62, second added data d71, and write history information d84, each being one file placement unit long, have been accumulated in the media buffer. An index version number "2" is added to the write history information d84. Reference character R22 indicates a reserved region.

At this point, as shown in FIG. 17C, the data held in the media buffer is written to an area M4. In this state, there still remains a blank region d92 (FIG. 16B) of one file placement unit. Reference character R23 denotes a reserved region.

It is further assumed that upon elapse of another predetermined time period since the writing of the data to the area M4, data d57 is accumulated as the main line data as indicated in FIG. 18A. The data d57 is less than five file placement units. Thus of the data d57, four file placement units of data d56 (i.e., the same data as the last time) are transferred to the media buffer. The first added data d62, second added data d71, and write history information d85, each being one file placement unit long, are also accumulated in the media buffer. An index version number "3" is added to the write history information d85.

Then the area M3 in which the write history information d83 (FIG. 17C) of the version number "1" is placed is overwritten with the data stored in the media buffer and supplemented by the write history information d85 of the index version number "3."

Thereafter, it is assumed that upon elapse of another predetermined time period, five file placement units of data d59 are accumulated as the main line data and transferred to the media buffer as shown in FIGS. 19A and 19B. And the first added data d62, second added data d71, and write history information d85, each being one file placement unit long, are accumulated in the media buffer. An index version number "4" is added to write history information d86. Thus eight file placement units of data are accumulated to constitute one complete write unit of data.

In that case, the index version number is "4," an even number, so that the data held in the media buffer is written to the area M4.

Also, the same data is again written to the area M3 as shown in FIG. 19C. It should be noted that data indicating the completion of the write operation is added to write history information d86'.

Thereafter, the area M is set to be included in a reserved area R24 as shown in FIG. 20C.

If the index version number is an odd number when one complete write unit of data is recorded, then the data indicating the completion of the write operation is simply added to the write history information. The same data shown in FIGS. 19A through 19C will not be recorded twice to the two areas M3 and M4. That is because there is no need to justify the recording regions.

Incidentally, the state of continuous write operations of less than one write unit of data as shown in FIGS. 15A through 20C takes place when, say, there are few changes in the image being taken as video data that is transmitted at a very low rate. The state of consecutive write operations of less than one write unit of data also corresponds to cases of so-called intermittent recording involving a very long cycle in which the imaging apparatus 2 takes images one frame at a time.

As explained above, the imaging apparatus embodying the present invention resolves the problems associated with cases in which less than a fixed access unit (i.e., one write unit) of buffered data suitable for high-speed writing to recording media is accumulated and recorded.

That is, even when less than one write unit of data fit for recording media is accumulated within a predetermined time period, the incomplete data is still written to the recording media. This arrangement prevents problematic situations such as where the video data acquired by the imaging apparatus 2 through imaging is to be written to the recording media but the amount of generated data is limited within a predetermined time period, or where the latest write data is not written to the recording media for a long time because of a prolonged frame cycle.

In such cases, less than one write unit of data is written to the recording media using two areas thereon alternately to repeat write operations until one complete write unit of data is recorded. In the case of the continuous recording of video data, incomplete data is eventually accumulated to make up one write unit that is recorded on the recording media with no wasteful uses of its recording capacity.

Because two areas on the recording media are used alternately to repeat write operations until one complete write unit of data is recorded, it is possible to prevent the recorded data from getting destroyed during an overwrite process. Thus data can be additionally written safely and rapidly.

Furthermore, as shown in FIGS. 19A through 20C, whenever one complete write unit of data is written, the recording regions on the media are justified so that one video material is recorded in the order of the areas arrayed on the recording media.

Also, where write operations are repeated until one write unit of data is recorded, the data indicating the number of times the data has been updated is attached to the data constituting the write history information. Based on that update count data, it is possible easily to determine to which area the newly added data is to be recorded.

[8. Variations]

The foregoing description of the embodiment of this invention has focused on the structure and processing operations of the recording apparatus incorporated in the imaging and recording apparatus such as a video camera for recording purposes. Alternatively, the present invention may be applied to other diverse kinds of recording apparatuses. That is, the recording processing similar to what was discussed above may be practiced in recording apparatuses designed to write video data and audio data to recording media, other than the imaging apparatus. As another alternative, this invention may be applied to recording apparatuses that record simultaneously the main data other than video data and audio data and the added data attached to the main data.

The specific data placement states shown in FIGS. 6A through 14B are illustrations explanatory of the principles of the above-described embodiment. Actual data placements may also be other than those illustrated in the accompanying drawings.

Where the processes of the present invention are implemented to bring about recording apparatuses dedicated to specific purposes such as the imaging apparatus shown in FIG. 1, the inventive processes may be practiced in an information processing apparatus (system) typically made up of a personal computer and its peripherals. That is, programs (i.e., software) for executing the processes of the invention may be installed into the personal computer, and the programs may be carried out to record various kinds of data to recording media on the computer in a manner similar to what was discussed above in this specification.

The data structure of the above-described write history information is an example and may be replaced by any other suitable structure. The data placements explained above are also examples and may be replaced by other suitable data placements.

The present application contains subject matter related to that disclosed in Japanese Priority Patent Application JP 2010-028255 filed in the Japan Patent Office on Feb. 10, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus comprising:
an input section configured to input or generate main data and added data thereof; and
a recording control section configured such that when said main data and said added data input or generated by said input section have each reached a predetermined data amount, said recording control section temporarily stores said main data and said added data in units of said predetermined data amount, that when the sum of the temporarily stored data has reached a specific write data unit, said recording control section transfers said temporarily stored data to recording media for recording thereto, and that when the amount of said temporarily stored data is less than that of said specific write data unit upon elapse of a predetermined time period since the most recent recording, said recording control section also transfers said temporarily stored data to said recording media for recording thereto.

2. The recording apparatus according to claim 1, wherein, when recording less than said specific write data unit of said temporarily stored data, said recording control section additionally writes to said recording media identification data identifying the number of times less than said specific write data unit of data has been written for an update.

3. The recording apparatus according to claim 2, wherein, when less than said specific write data unit of data is written continuously a plurality of times, said recording control section uses at least two recording regions alternately for the write operations on said recording media.

4. The recording apparatus according to claim 3, wherein, when the writing of said specific write, data unit of data is completed, said recording control section deletes the recorded data less than the amount of said specific write data unit.

5. An imaging and recording apparatus comprising:
an imaging section configured to acquire video data through imaging; and
a recording control section configured such that when said video data and added data thereof have each reached a predetermined data amount, said recording control section temporarily stores said video data and said added data in units of said predetermined data amount; that when the sum of the temporarily stored data has reached a specific write data unit, said recording control section transfers said temporarily stored data to recording media for recording thereto; and that when said temporarily stored data is less than the amount of said specific write data unit upon elapse of a predetermined time period since the most recent recording, said recording control section also transfers said temporarily stored data to said recording media for recording thereto.

6. The imaging and recording apparatus according to claim 5, wherein, when recording less than said specific write data unit of said temporarily stored data, said recording control section additionally writes to said recording media identification data identifying the number of times less than said specific write data unit of data has been written for an update.

7. The imaging and recording apparatus according to claim 6, wherein, when less than said specific write data unit of data is written continuously a plurality of times, said recording control section uses at least two recording regions alternately for the write operations on said recording media.

8. The imaging and recording apparatus according to claim 7, wherein, when the writing of said specific write data unit of data is completed, said recording control section deletes the recorded data less than the amount of said specific write data unit.

9. A recording method comprising the steps of:
when input or generated main data and added data thereof have each reached a predetermined data amount, temporarily storing the main data and the added data in units of said predetermined data amount;
when the sum of the temporarily stored data has reached a specific write data unit, transferring said temporarily stored data to recording media for recording thereto; and
when said temporarily stored data is less than the amount of said specific write data unit upon elapse of a predetermined time period since the most recent recording, also transferring said temporarily stored data to said recording media for recording thereto.

10. A non-transitory computer-readable storage medium having stored thereon a program executable by an information processing apparatus to perform the steps of:
when input or generated main data and added data thereof have each reached a predetermined data amount, temporarily storing the main data and the added data in units of said predetermined data amount;
when the sum of the temporarily stored data has reached a specific write data unit, transferring said temporarily stored data to recording media for recording thereto; and
when said temporarily stored data is less than the amount of said specific write data unit upon elapse of a predetermined time period since the most recent recording, also transferring said temporarily stored data to said recording media for recording thereto.

11. A recording apparatus comprising:
input means for inputting or generate main data and added data thereof; and
recording control means configured such that when said main data and said added data input or generated by said input means have each reached a predetermined data amount, said recording control means temporarily stores said main data and said added data in units of said predetermined data amount, that when the sum of the temporarily stored data has reached a specific write data unit, said recording control means transfers said temporarily stored data to recording media for recording thereto, and that when the amount of said temporarily stored data is less than that of said specific write data unit upon elapse of a predetermined time period since the most recent recording, said recording control means also transfers said temporarily stored data to said recording media for recording thereto.

12. An imaging and recording apparatus comprising:
imaging means for acquiring video data through imaging; and
recording control means configured such that when said video data and added data thereof have each reached a predetermined data amount, said recording control means temporarily stores said video data and said added data in units of said predetermined data amount; that when the sum of the temporarily stored data has reached a specific write data unit, said recording control means transfers said temporarily stored data to recording media for recording thereto; and that when said temporarily stored data is less than the amount of said specific write data unit upon elapse of a predetermined time period since the most recent recording, said recording control means also transfers said temporarily stored data to said recording media for recording thereto.

* * * * *